United States Patent
Tajima et al.

(10) Patent No.: US 6,250,814 B1
(45) Date of Patent: Jun. 26, 2001

(54) AUTOMOTIVE WHEEL BEARING ASSEMBLY AND METHOD FOR MANUFACTURING THE SAME

(75) Inventors: Eiji Tajima; Shigeaki Fukushima; Akira Torii; Hisashi Ohtsuki, all of Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/437,149

(22) Filed: Nov. 10, 1999

(30) Foreign Application Priority Data

| Apr. 22, 1909 | (JP) | 11-115091 |
| Nov. 11, 1998 | (JP) | 10320911 |
| Dec. 22, 1998 | (JP) | 10-364793 |
| Jan. 28, 1999 | (JP) | 11-20499 |
| Feb. 24, 1999 | (JP) | 11-46790 |
| Sep. 30, 1999 | (JP) | 11-278099 |

(51) Int. Cl.[7] ............................................. F16C 13/00
(52) U.S. Cl. ..................... 384/544; 188/18 A; 301/105.1
(58) Field of Search .................. 384/544, 589; 188/18 A; 301/6.1, 105.1; 29/898.04, 898.06; 451/63, 902

(56) References Cited

U.S. PATENT DOCUMENTS

| 3,665,657 | * | 5/1972 | Lill | 451/397 |
| 5,430,926 | * | 7/1995 | Hartford | 29/434 |
| 5,899,305 | * | 5/1999 | Austin et al. | 188/218 XL |

* cited by examiner

Primary Examiner—Thomas R. Hannon
(74) Attorney, Agent, or Firm—Wenderoth, Lind & Ponack, L.L.P.

(57) ABSTRACT

Reliable wheel bearing assemblies are proposed which need no troublesome runout adjustment at a car assembling factory. There are provided wheel bearing assemblies comprising an outer member having two raceways on an inner circumferential surface thereof, an inner member having raceways each provided opposite the two raceways of the outer member, and rolling elements arranged in two rows between the outer and inner members. One of the outer and inner members is provided with a wheel mounting flange. The runout of the wheel mounting flange is restricted within a predetermined value, and a brake rotor is fixed to one side of the wheel mounting flange. Different methods for minimizing the runout are proposed.

50 Claims, 31 Drawing Sheets

AUTOMOTIVE WHEEL BEARING ASSEMBLY AND METHOD FOR MANUFACTURING THE SAME

BACKGROUND OF THE INVENTION

This invention relates to an automotive wheel bearing assembly and a method for manufacturing the same.

Among automotive wheel bearing assemblies, there are ones for driving wheels and ones for non-driving wheels. As an example, a wheel bearing assembly for a driving wheel is shown in FIG. 10. It comprises an outer member 3 having two raceways 3a, 3b on its inner peripheral surface, an inner member 1 having raceways 1a, 1b opposite the respective raceways 3a, 3b, and rolling elements 8 disposed between the outer member 3 and the inner member 1 in two rows. A wheel-mounting flange 2 is provided on the outer member 3 or the inner member 1. In the example shown in FIG. 10, the wheel mounting flange 2 is formed on the inner member 1 having a spline hole 9 for a drive shaft in inner periphery thereof.

A brake rotor 20 is fixed by bolts 18 to the side 2a of the wheel-mounting flange 2 of each device. But after assembling, if there should be a runout of the brake rotor 20, with increasing speed of cars, brake vibrations may occur during braking, or brakes may be worn unevenly. Depending on the degree of runout, brake vibrations may occur even at low speeds.

Heretofore, in order to minimize such runout of the brake rotor 20, adjustment of e.g. phase of the bolts which were pressed into the wheel mounting flange 2 with respect to the bolt hole of the brake rotor 20 was necessary. Such a work is troublesome and poor in workability.

Also, if the outer raceway 1a is directly formed on the inner member 1, it is necessary to form a hardened layer 21 on the raceway 1a. Thus, the outer peripheral surface of the inner member 1 is hardened by heat treatment.

Heretofore, when the outer surface of the inner member 1 is heat-treated, a heat-affected layer of the hardened layer 21 on the raceway 1a extends beyond a seal land portion 22 and reaches bolt holes 11 for hub bolts 7 formed in the wheel mounting flange 2.

But, if there exists a heat-affected layer over such a wide range, when the hub bolts 7 are pressed into the bolt holes 11, strain will act on (i.e. distort) the wheel mounting flange 2. This increases the runout of the wheel mounting flange.

If the runout of the wheel mounting flange is large, the brake rotor 20 fixed to the side face 2a by bolts 18 tends to runout. This may cause brake judder and abnormal sound.

An object of this invention is to prevent vibrations and uneven wear of a brake resulting from runout of the brake rotor caused with an increase in the car speed, and to provide a reliable wheel bearing assembly which needs no troublesome runout adjustment when mounting the brake rotor.

Another object of this invention is to provide a wheel bearing assembly which minimizes runout of the wheel mounting flange to prevent brake judder and abnormal sounds.

A still another object of this invention is to provide a constant-velocity joint mounted in a wheel bearing assembly for a driving wheel which is reliable and prevents stick-slip sound.

SUMMARY OF THE INVENTION

According to this invention, there is provided a wheel bearing assembly comprising an outer member having two raceways on inner peripheral surface thereof, an inner member having raceways formed thereon so as to be opposite to the two raceways, and rolling elements arranged in two rows between the outer member and the inner member, one of the outer member and the inner member being formed with a wheel mounting flange, a brake rotor being mounted on one side of the wheel mounting flange, characterized in that the maximum runout variation of the one side of the wheel mounting flange is restricted within a predetermined value when one of the outer member and the inner member that has a wheel mounting flange is rotated with the other fixed.

By this arrangement, troublesome adjustment of runout of the brake rotor after it has been mounted becomes unnecessary.

In the above arrangement, by restricting the maximum variation of runout of the side face of the wheel mounting flange to 50 μm, reliable assemblies are obtained.

By restricting the maximum runout variation per cycle of runout within a predetermined value, it is possible to suppress runout of the brake rotor. The predetermined value is preferably 30 μm.

Further, if the frequency of runout per revolution is equal to the number of wheel-mounting bolts multiplied by an integer, or if the number of wheel-mounting bolts is equal to the frequency multiplied by an integer, it is possible to make more uniform the deformation of the brake rotor due to tightening force of the mounting bolts between the peaks of runout of the brake rotor mounting surface against which the brake rotor is pressed, thus preventing increase of runout due to deformation of the brake rotor. The mounting position of the wheel-mounting bolts may not necessarily coincide with the positions of the peaks or valleys of runout of the brake rotor mounting surface.

The wheel mounting flange may be formed integral with the inner member.

A drive shaft may be mounted in the inner member, or the inner member may be formed integral with the outer ring of a constant-velocity joint.

Restriction of runout of the side of the wheel mounting flange may be carried out with reference to the axis of rotation of the inner member or outer member having the wheel mounting flange before it is assembled, or may be carried out by rotating the wheel mounting flange with the wheel bearing assembly assembled.

According to this invention, at least one of the raceways formed on the inner member on the side near the wheel mounting flange is formed directly on the inner member, and a heat-affected layer of a hardened layer formed on the raceway on the side near the wheel mounting flange is restricted so as not to reach holes for hub bolts formed in the wheel mounting flange.

If the heat-affected layer of the hardened layer does not reach the bolt holes for hub bolts in the wheel mounting flange, it is possible to prevent deformation of the wheel mounting flange. Thus the runout of the wheel mounting flange can be suppressed to a minimum.

By adjusting the depth of the hardened layer at the raceway to 0.7–4 mm at the deepest portion, and the depth of the hardened layer at the seal land portion to 0.3–2 mm at the deepest portion, it is possible to prevent the heat-affected layer of the hardened layer from reaching the bolt holes.

According to the present invention, a brake rotor fixing surface on one side of the wheel mounting flange is finished to finer surface roughness than the other side.

By fixing the brake rotor to the side of the wheel-mounting flange finished to fine surface roughness, it is possible to suppress runout of the brake rotor.

Thus, troublesome runout adjustment of the brake rotor at the car assembling factory becomes unnecessary.

In the above arrangement, by adjusting the surface roughness of one side of the wheel-mounting flange to which the brake rotor is fixed to 3 Ra or under, and the surface roughness of the other side to 3–6 Ra, good results are obtained. The surface roughness of 3 Ra is obtainable by forming the wheel-mounting flange by primary cutting and then performing secondary cutting on the brake rotor fixing surface on one side thereof.

It is advantageous because of lesser number of the parts to form raceways directly on the outer periphery of the inner member or the inner periphery of the outer member.

The present invention is applicable to both wheel bearing assemblies for a driving wheel and those for a non-driving wheel.

According to the present invention, after a cylindrical portion on the side of the raceways of the outer member or the inner member provided with the wheel mounting flange has been formed by turning, the brake rotor fixing surface of the wheel mounting flange is finished by cutting with the cylindrical surface of the cylindrical portion as a reference.

By finish-cutting the brake rotor fixing surface with the cylindrical portion on the raceway side as a reference, the brake rotor fixing surface can be accurately worked relative to the rotation axis of the inner member or outer member, so that it is possible to suppress the runout of the brake rotor fixing surface to a minimum.

Thus, no troublesome runout adjustment of the brake rotor at the car assembling factory is necessary.

Also, by finishing the roughness of the brake rotor fixing surface finely, i.e. to 3 Ra or under, it is possible to further suppress runout of the brake rotor.

The surface roughness of 3 Ra or under may be achieved by forming the wheel mounting flange by primary turning and then performing secondary turning on the brake rotor fixing surface on one side while rotating the inner member or outer member with the raceway as a reference.

Other features and objects of the present invention will become apparent from the following description made with reference to the accompanying drawings, in which:

DETAILED DESCRIPTION OF THE PREFERRED EMBODIMENT

Figure 1:
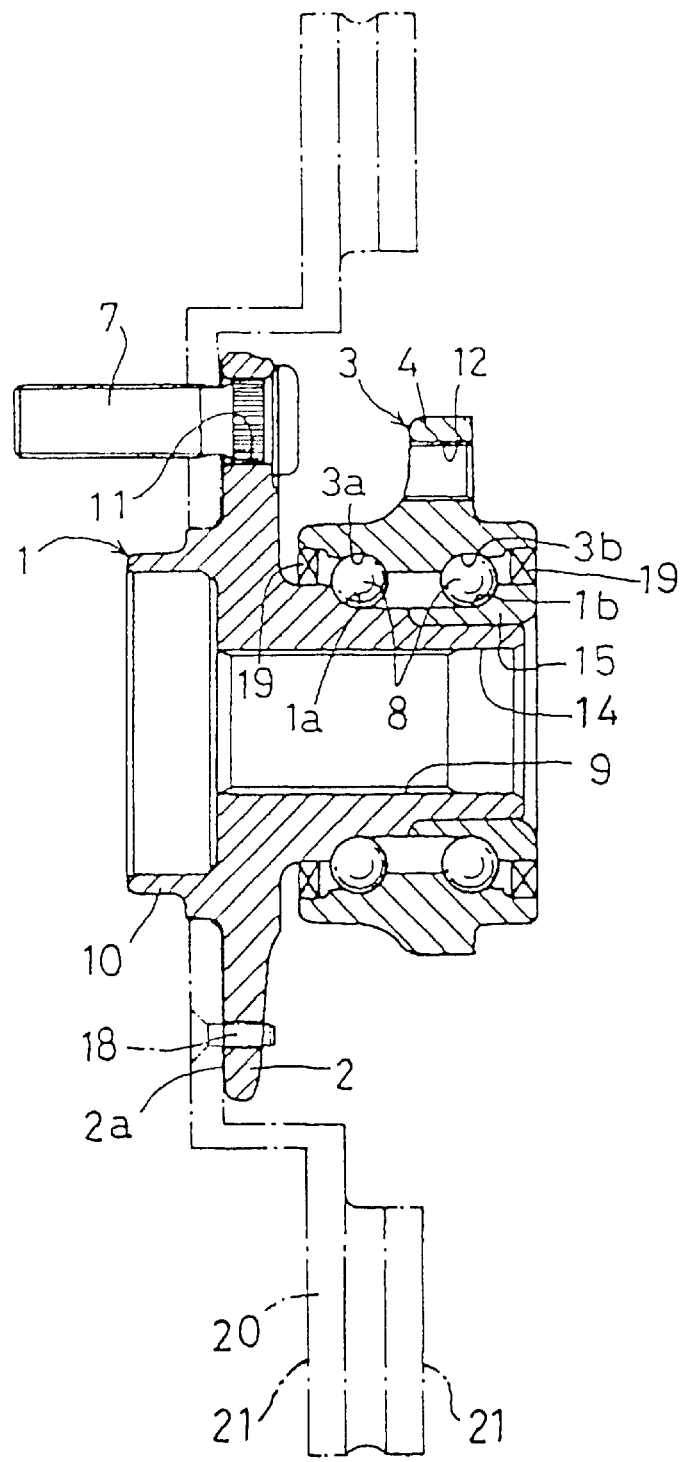
FIG. 1 is a sectional view of a first embodiment of a wheel bearing assembly for a driving wheel according to this invention.
Figure 5:
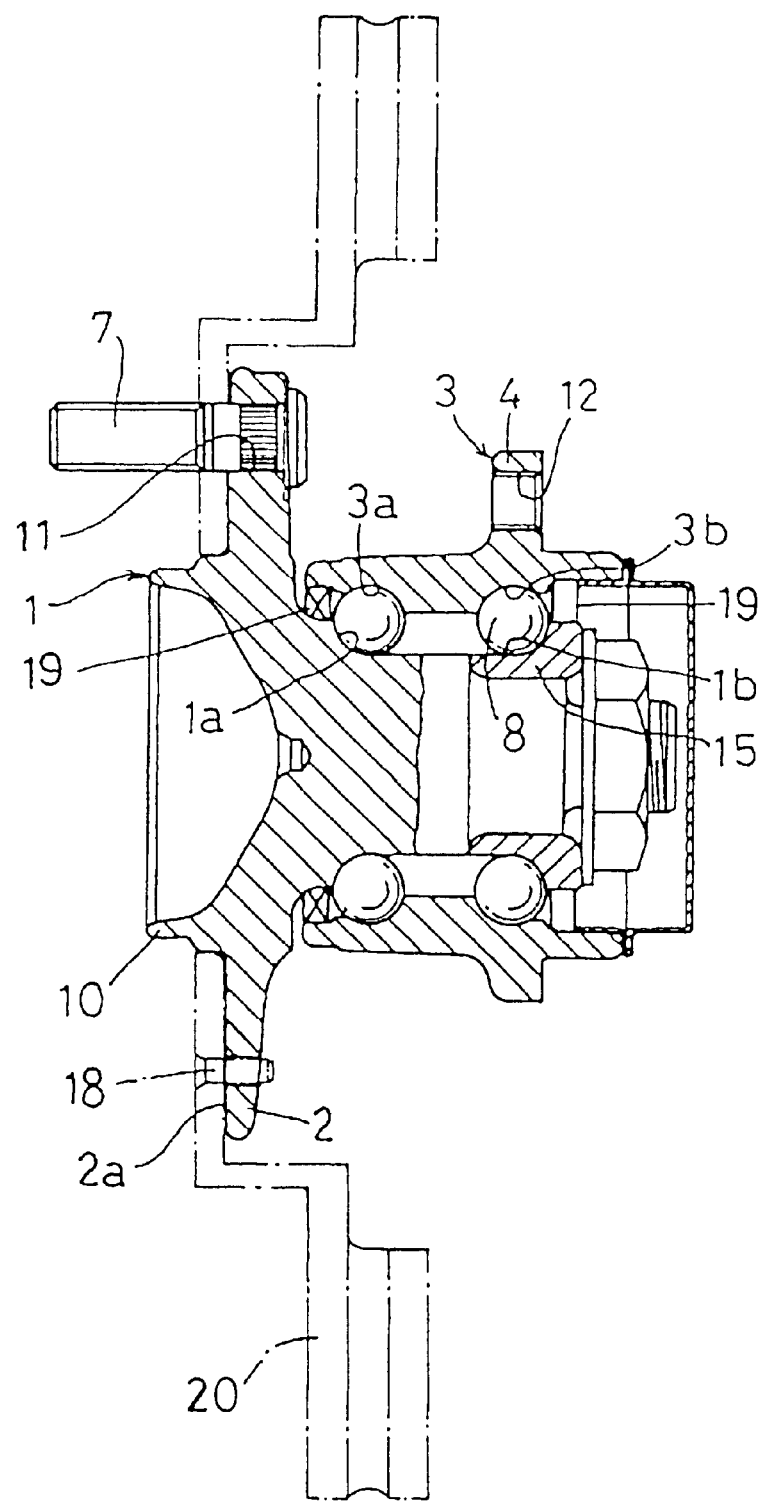
FIGS. 5–7 are sectional views of fifth to seventh embodiments of the wheel bearing assembly for a non-driving wheel according to this invention.
Figure 6:
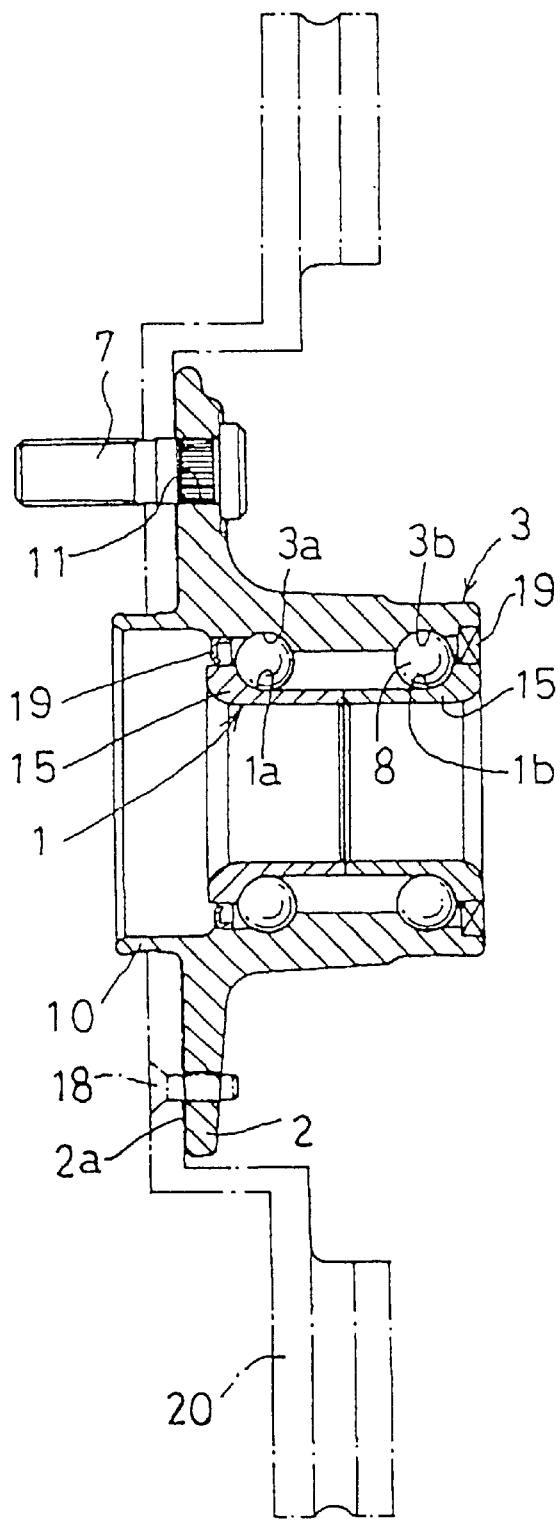
Figure 7:
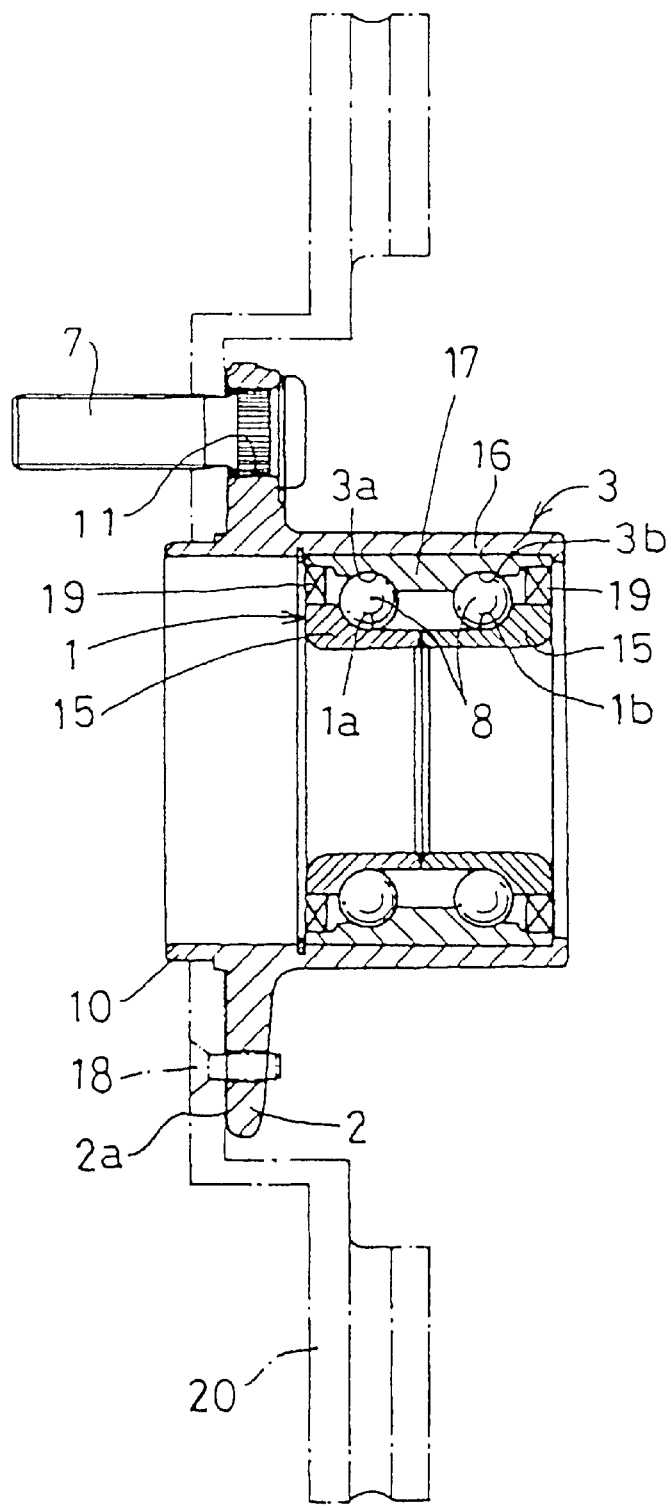

An automotive wheel bearing assembly comprises, as shown in FIG. 1, an outer member 3 having two raceways 3a, 3b on its inner peripheral surface, an inner member 1 having raceways 1a, 1b opposite the raceways 3a, 3b, and rolling elements 8 disposed between the outer member 3 and the inner member 1 in two rows. The inner member 1 has a wheel-mounting flange 2. Specifically, there are ones for a driving wheel, in which a drive shaft is mounted, as shown in FIGS. 1 through 4, and ones for a non-driving wheel, in which no drive shaft is mounted, as shown in FIGS. 5 through 7.

(First Embodiment)

The wheel bearing assembly shown in FIG. 1 is one for a driving wheel, which is a first embodiment of this invention. The inner member 1 is formed with a hole 9 having splines on its inner circumferential surface adapted to engage a drive shaft. Of the two raceways 1a, 1b of the inner member 1, the outer raceway 1a is formed directly on the outer circumferential surface of the inner member 1, while the inner raceway 1b is formed on a separate inner ring 15 which is fitted onto a shoulder formed at one end of a hub wheel 14. The hub wheel of the inner member 1 of FIG. 1 has an integral wheel mounting flange 2 formed with a wheel pilot 10 at outer side in its center. The wheel mounting flange 2 is formed with bolt holes 11 for hub bolts 7 for fixing a wheel. The brake rotor 20 is held in position to an outer side 2a of the flange 2 by bolts 18 and tightly fixed by bolts 7 between the wheel hub and the outer side 2a.

The two raceways 3a, 3b are formed directly on the inner circumferential surface of the outer member 3. Further, the outer member 3 has an integral flange 4 having bolt holes 12 and adapted to be fixed to the car body.

Figure 8:
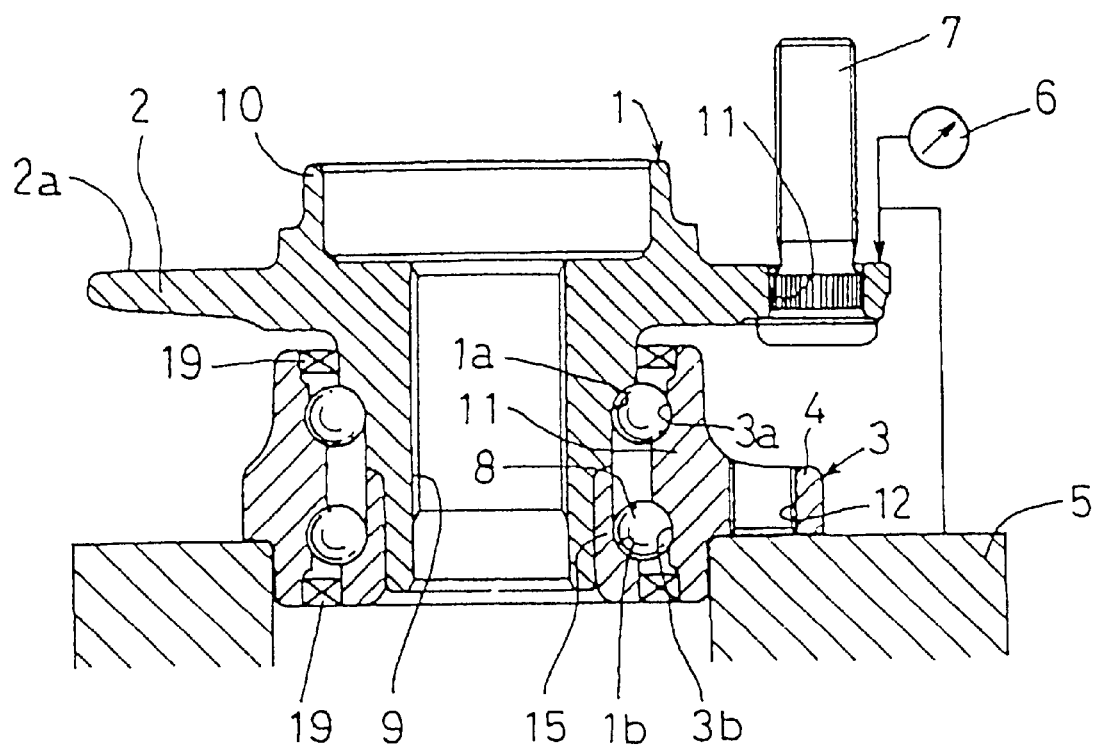
FIG. 8 is a schematic view showing a method for measuring the runout of the side face of the wheel mounting flange.

With the wheel bearing assembly of the first embodiment assembled, as shown in FIG. 8, the outer member 3 was fixed to a measuring table 5 as a reference, and the inner member 1 formed with the wheel-mounting flange 2 was rotated one full turn to measure the runout of the side 2a of the wheel-mounting flange 2 with a dial gauge 6. Since the runout of the side 2a is larger at an outer-diameter side of the wheel-mounting flange 2, for better control of surface runout, the dial gauge 6 was abutted at an intermediate position between the circumcircle of the bolt holes 11 for the wheel-mounting bolts 7 and the outer periphery of the wheel-mounting flange 2.

Figure 9:
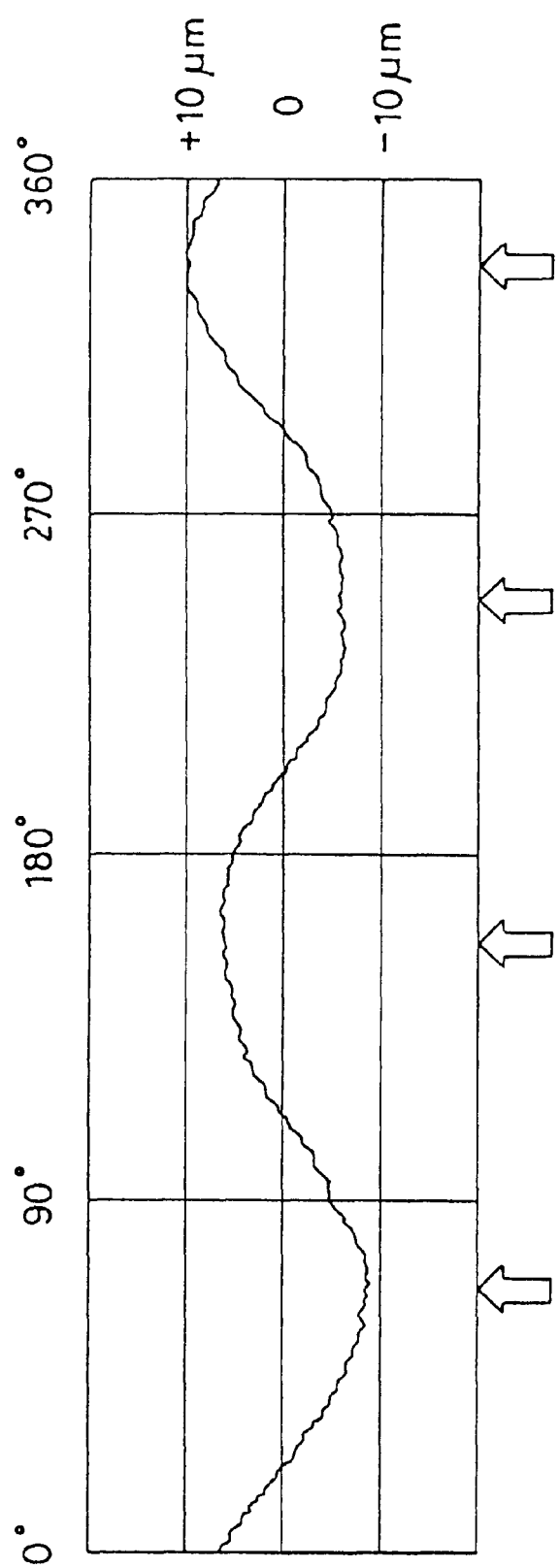
FIG. 9 is a graph showing the results of measurements of runout.
Figure 10:
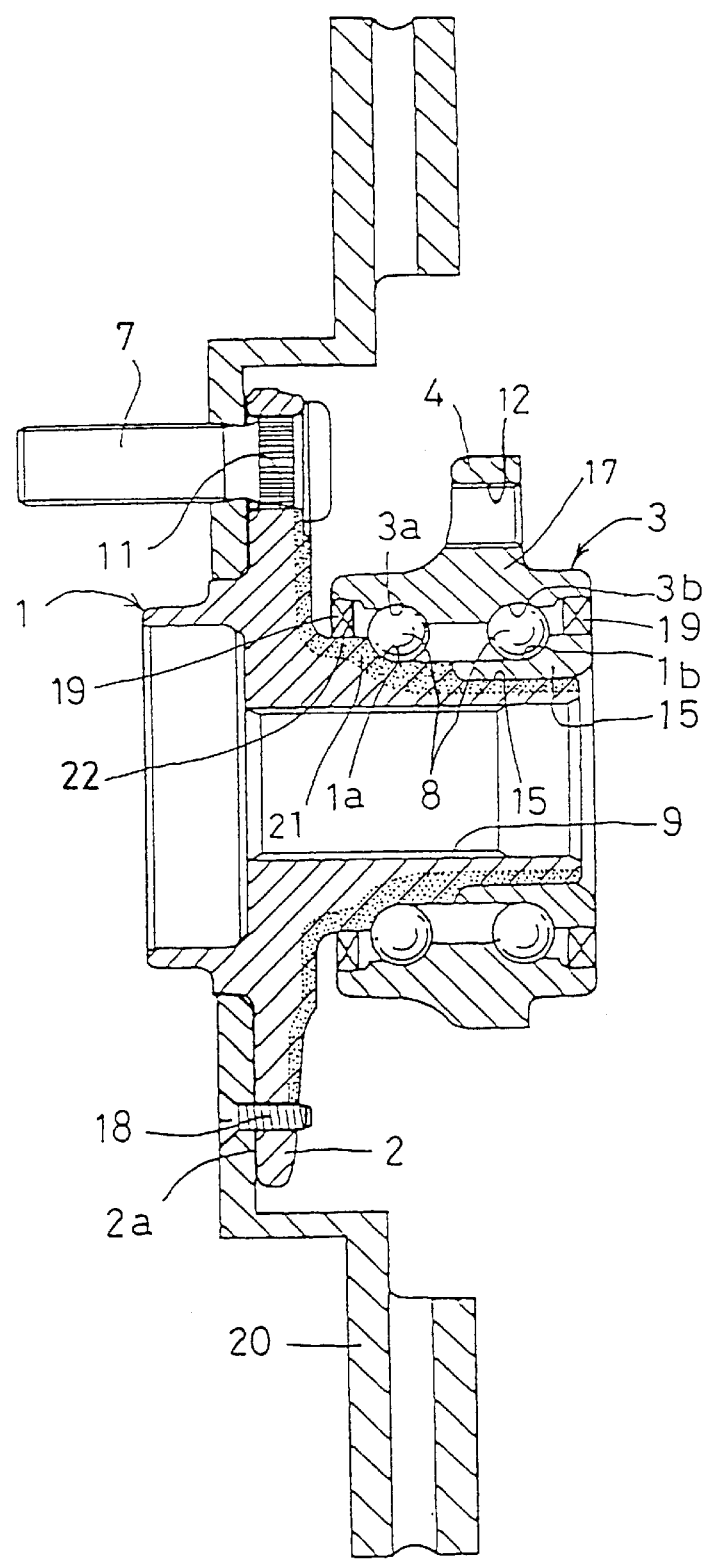
FIG. 10 is a sectional view of the prior art assembly.

FIG. 9 shows the measurement results. The surface runout of the side 2a shows two peaks (or two cycles), and the maximum runout variation and the maximum runout variation per cycle are both 20 $\mu$m, which should be lower than the respective standard values 50 $\mu$m and 30 $\mu$m. The wheel-mounting bolts 7 used in this case are four, and as shown by the arrows in FIG. 9, their mounting positions coincide with the positions of the peaks and valleys of runout.

The number of peaks of runout shown in FIG. 9 is two. If the number of peaks are two or less, the maximum runout variation and the maximum runout variation per cycle are the same. If the number of peaks are three or more, the two values are not necessarily the same, and naturally, the former is greater. Also although in FIG. 9, the positions of the mounting bolts 7 coincide with the positions of the peaks and valleys of surface runout, they do not necessarily have to coincide.

In each of the embodiments shown below, although measurement results of runout are omitted, the maximum runout variation and the maximum runout variation per cycle are suppressed at values smaller than the respective standard values 50 $\mu$m and 30 $\mu$m. The number of peaks of runout is two, and the number of wheel-mounting bolts is four.

(Second Embodiment)

Figure 2:
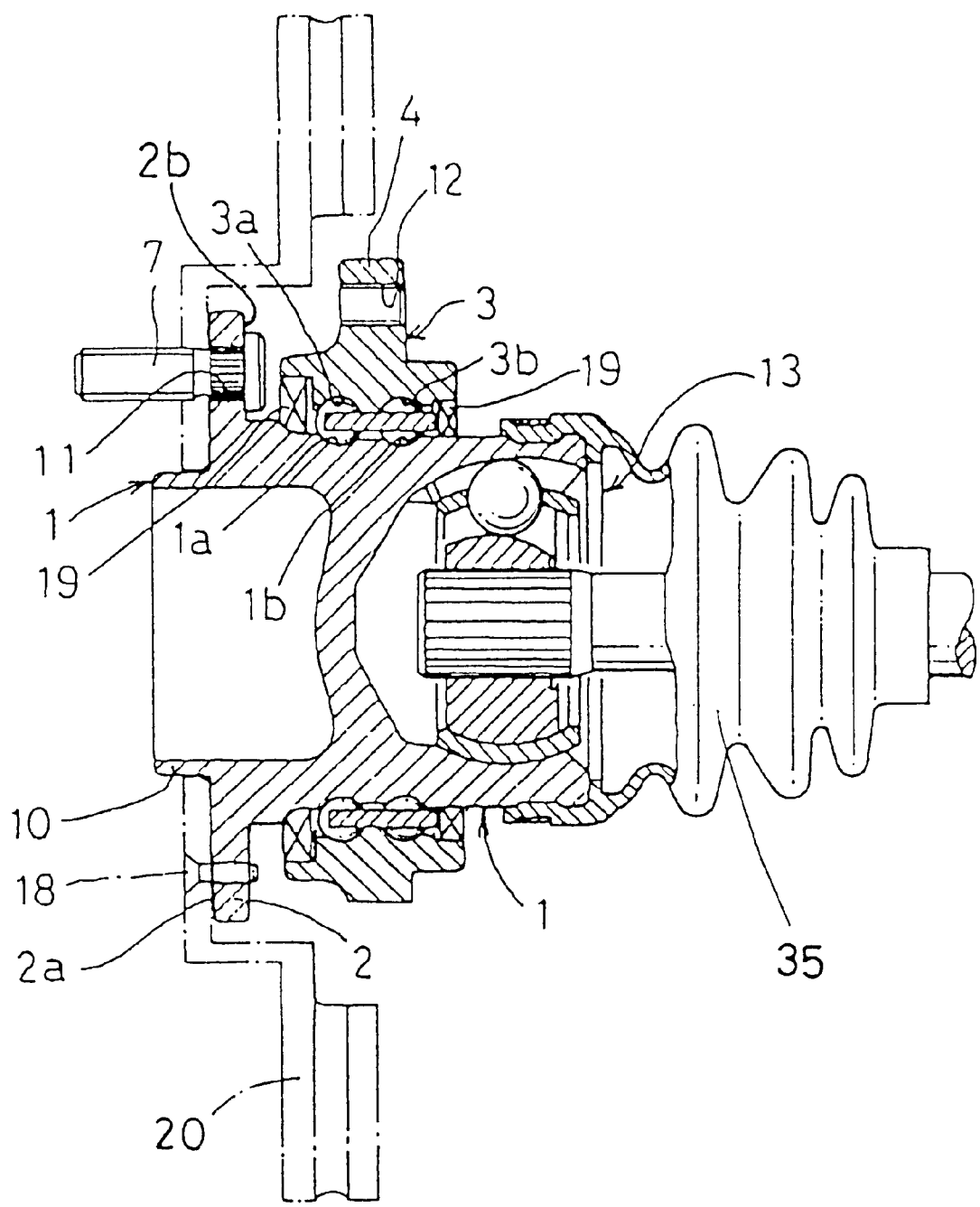
FIGS. 2–4 are sectional views of second to fourth embodiments of the wheel bearing assembly for a driving wheel according to this invention.

Next, the wheel bearing assembly shown in FIG. 2 is a wheel bearing assembly for a driving wheel, which is a second embodiment of this invention. In this embodiment, the inner member 1 is integral with an outer ring of a constant-velocity joint 35. Two raceways 1a, 1b are formed directly on the outer circumferential surface of the inner member 1. Also, a wheel pilot 10 and a wheel mounting flange 2 are integrally formed on the inner member 1 at its outer end. On the other hand, two raceways 3a, 3b are directly formed on the inner circumferential surface of the outer member 3. Also, the outer member 3 has on outer surface thereof a flange 4 having bolt holes 12 and adapted to be fixed to the car body. In the embodiment of FIG. 2, a brake rotor 20 is fixed to the side 2a of the flange 2 by bolts 18.

This embodiment is the same as the first embodiment in other structural points.

(Third Embodiment)

Figure 3:
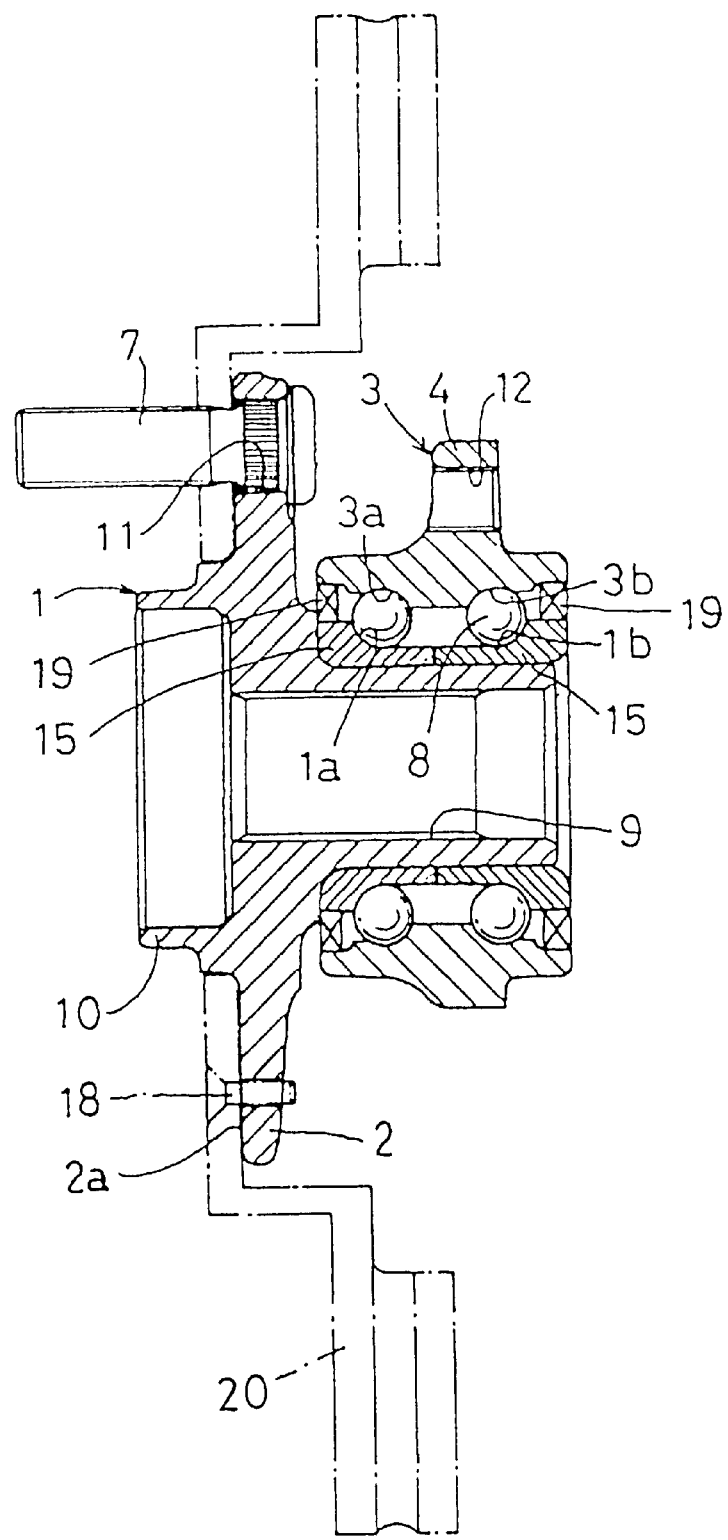

The wheel bearing assembly shown in FIG. 3 is also one for a driving wheel, which is a third embodiment of this invention. The two raceways 1a, 1b of the inner member 1 are formed on two separate inner rings 15. The inner member 1 has a wheel mounting flange 2. On the other hand, like the wheel bearing assemblies shown in FIGS. 1 and 2, the outer member 3 has two raceways 3a, 3b formed directly on its inner circumferential surface.

This embodiment is the same as the first embodiment in other structural points.

(Fourth Embodiment)

Figure 4:
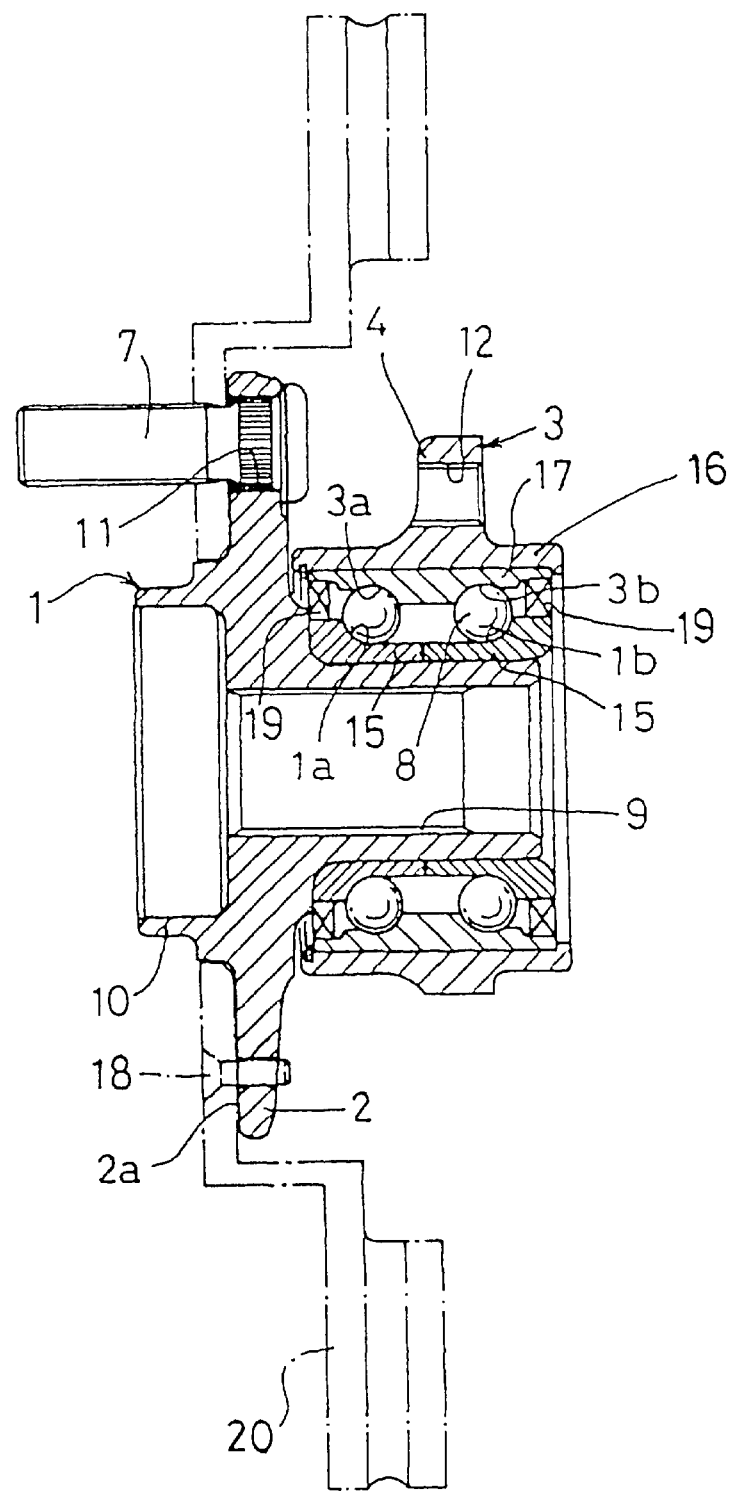

The wheel bearing assembly shown in FIG. 4 is also one for a driving wheel, which is a fourth embodiment of this invention. Like the one shown in FIG. 3, the inner member 1, which is mounted on a drive shaft, has two raceways 1a, 1b formed on two separate inner rings 15. Also, the outer member 3 comprises a housing 16 formed with a flange 4 adapted to be fixed to the car body, and an outer ring 17 formed with two raceways 3a, 3b.

This embodiment is the same as the first embodiment in other structural points.

(Fifth Embodiment) Next, the wheel bearing assembly shown in FIG. 5 is a wheel bearing assembly for a non-driving wheel, which is a fifth embodiment of this invention. Of two raceways 1a, 1b of the inner member 1, the outer raceway 1a is formed directly on its outer surface, while the inner raceway 1b is formed on a separate inner ring 15 mounted on its inner end. The inner member 1 is integrally formed with a wheel mounting flange 2. Also, the outer member 3 has two raceways 3a, 3b formed directly on its inner peripheral surface, and has on its outer peripheral surface a flange 4 having bolt holes 12 for fixing to the car body.

This embodiment is the same as the first embodiment in other structural points.

(Sixth Embodiment)

The wheel bearing assembly shown in FIG. 6 is a wheel bearing assembly for a non-driving wheel, which is a sixth embodiment of this invention. It has a wheel mounting flange 2 integrally formed on the outer member 3, and has two raceways 3a, 3b directly formed on the inner surface of the outer member 3. Inside the outer member 3, an inner member 1 (comprising inner rings 15) having raceways 1a, 1b on its outer surface is provided. In this embodiment, a brake rotor 20 is fixed to the outer side 2a of the wheel mounting flange 2 of the outer member 3.

This embodiment is the same as the first embodiment in other structural points.

(Seventh Embodiment)

The wheel bearing assembly shown in FIG. 7 is a seventh embodiment of this invention for non-driving wheel. It has an outer member 3 comprising an outer ring 17 having two raceways 3a, 3b on its inner circumferential surface and having a wheel mounting flange 2. An inner member 1 (comprising inner rings 15) formed with raceways 1a, 1b on its outer surface is provided inside the outer member 3 through rolling elements 8. In this embodiment, a brake rotor 20 is fixed to the outer side 2a of the wheel mounting flange 2 of the outer member 3 by bolts 18.

This embodiment is the same as the first embodiment in other structural points.

In the following eighth to 11th embodiments, at least one of the raceways formed on the inner member on the side near the wheel mounting flange is formed directly on the inner member, and a heat-affected layer of a hardened layer formed on the raceway on the side near the wheel mounting flange is restricted so as not to reach holes for hub bolts formed in the wheel mounting flange.

(Eighth Embodiment)

Figure 11:
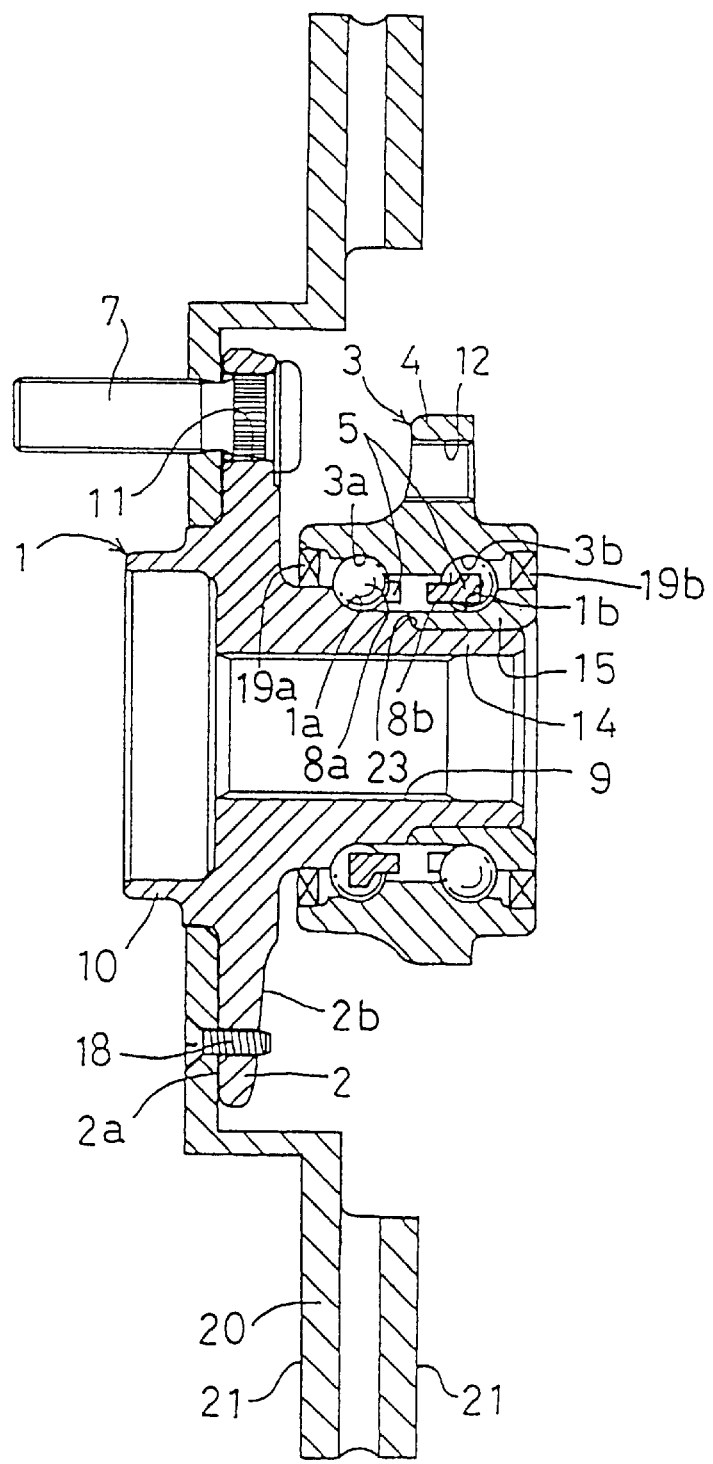
FIG. 11 is a sectional view of an eighth embodiment.

The automotive wheel bearing assembly shown in FIG. 11 is a wheel bearing assembly for a driving wheel, which is an eighth embodiment of this invention.

The wheel bearing assembly shown in FIG. 11 has substantially the same structure as the first embodiment shown in FIG. 1.

On the outer circumferential surface of the inner member 1, a seal land portion 22 (FIG. 12) for a seal 19a, a raceway 1a for the outer rolling elements 8a, and a shoulder 23 for receiving a separate inner ring 15 formed with an inner raceway 1b for the inner rolling elements 8b are integrally formed.

Figure 12:
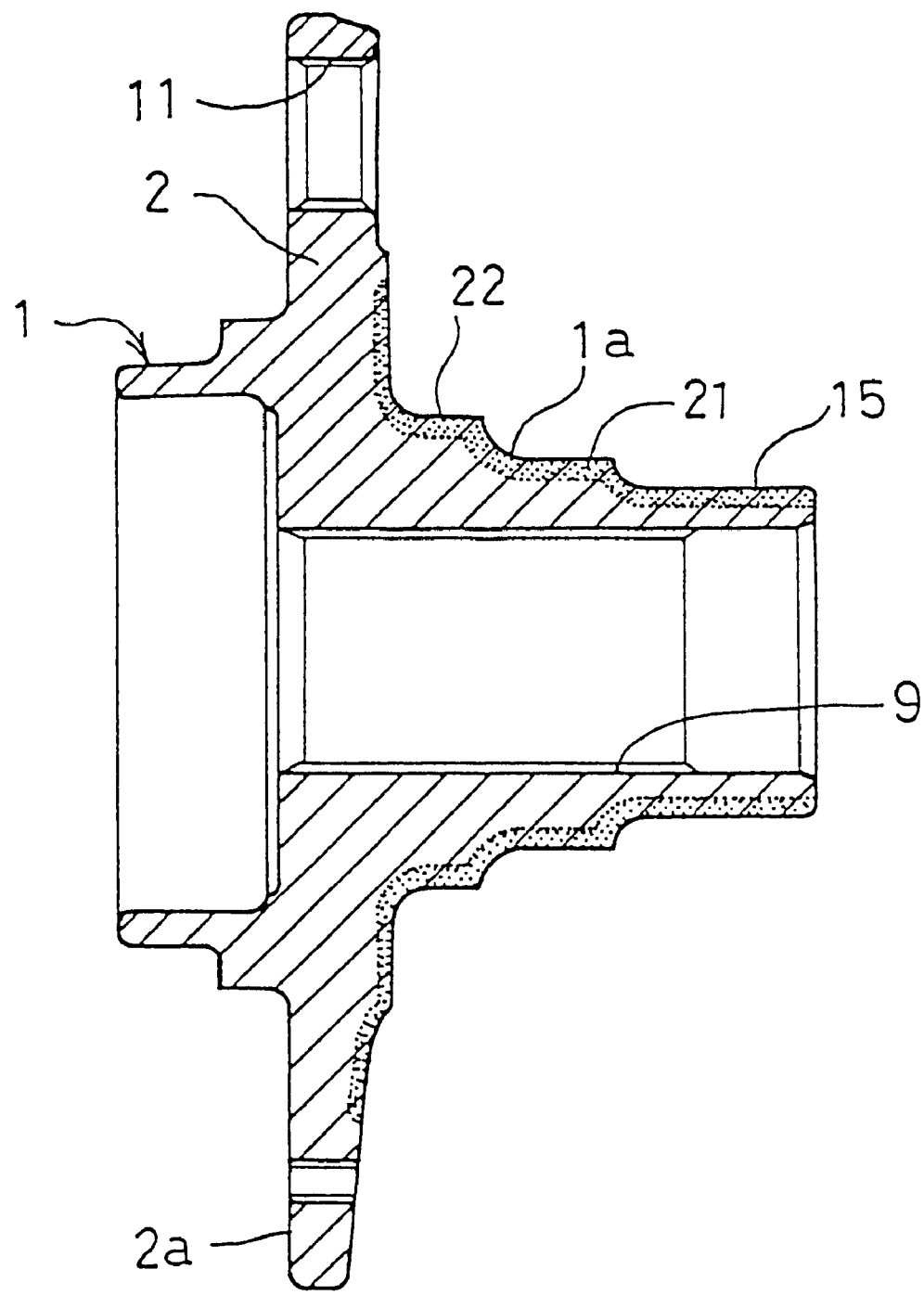
FIG. 12 is a sectional view of the inner member of the eighth embodiment.

On the raceway 1a formed directly on the outer circumferential surface of the inner member 1, a hardened layer 21 is formed by heat treatment as shown in FIG. 12.

Heat treatment may be carried out by high-frequency heating (induction hardening). Its depth is restricted such that the heat-affected layer of the hardened layer 21 will extend beyond the seal land portion 22 but not reach the bolt holes 11 for hub bolts 7 formed in the wheel mounting flange 2.

Its depth at the raceway 1a is restricted within the range of 0.7–4 mm at the deepest portion, and the depth at the seal land portion 22 is shallower than at the raceway 1a and is 0.3–2 mm at the deepest portion.

(Ninth Embodiment)

Figure 13:
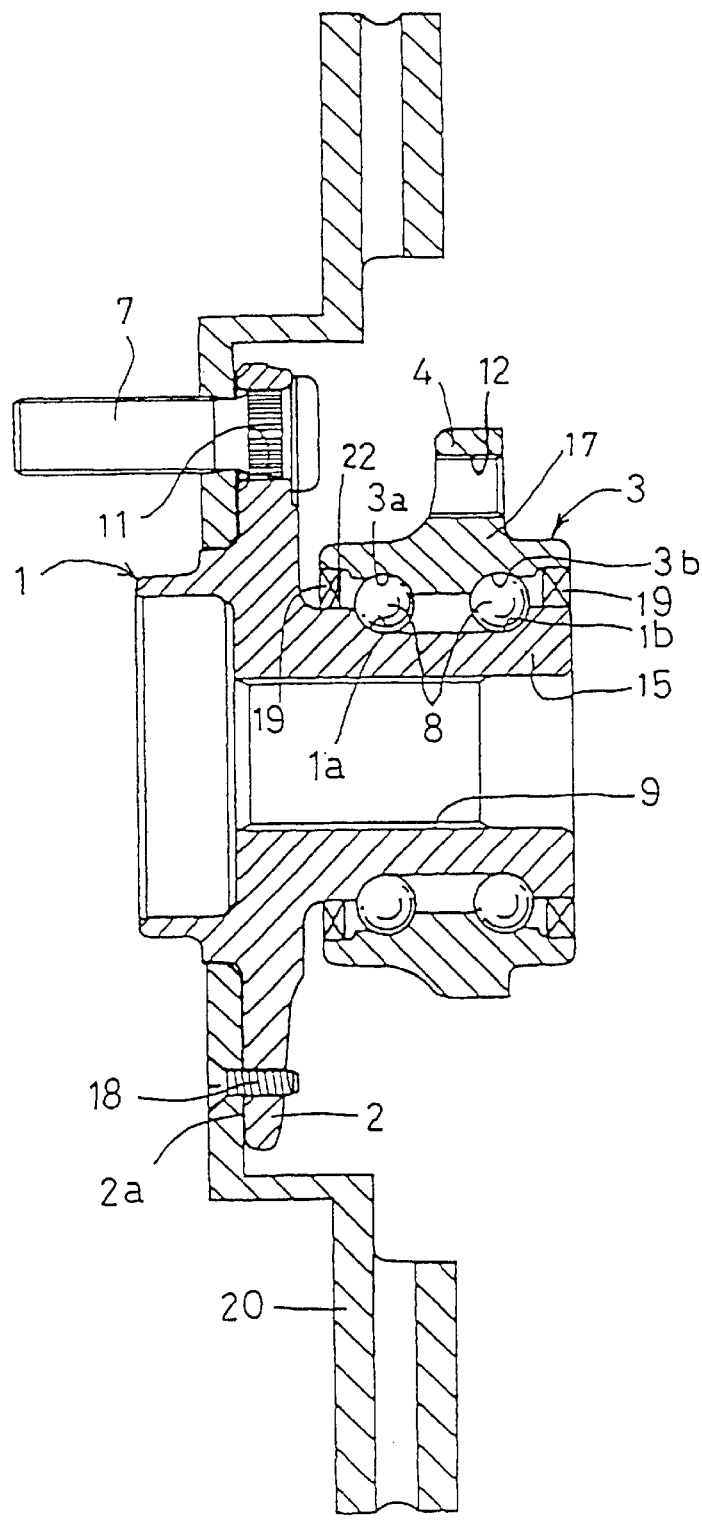
FIG. 13 is a sectional view of a ninth embodiment.
Figure 14:
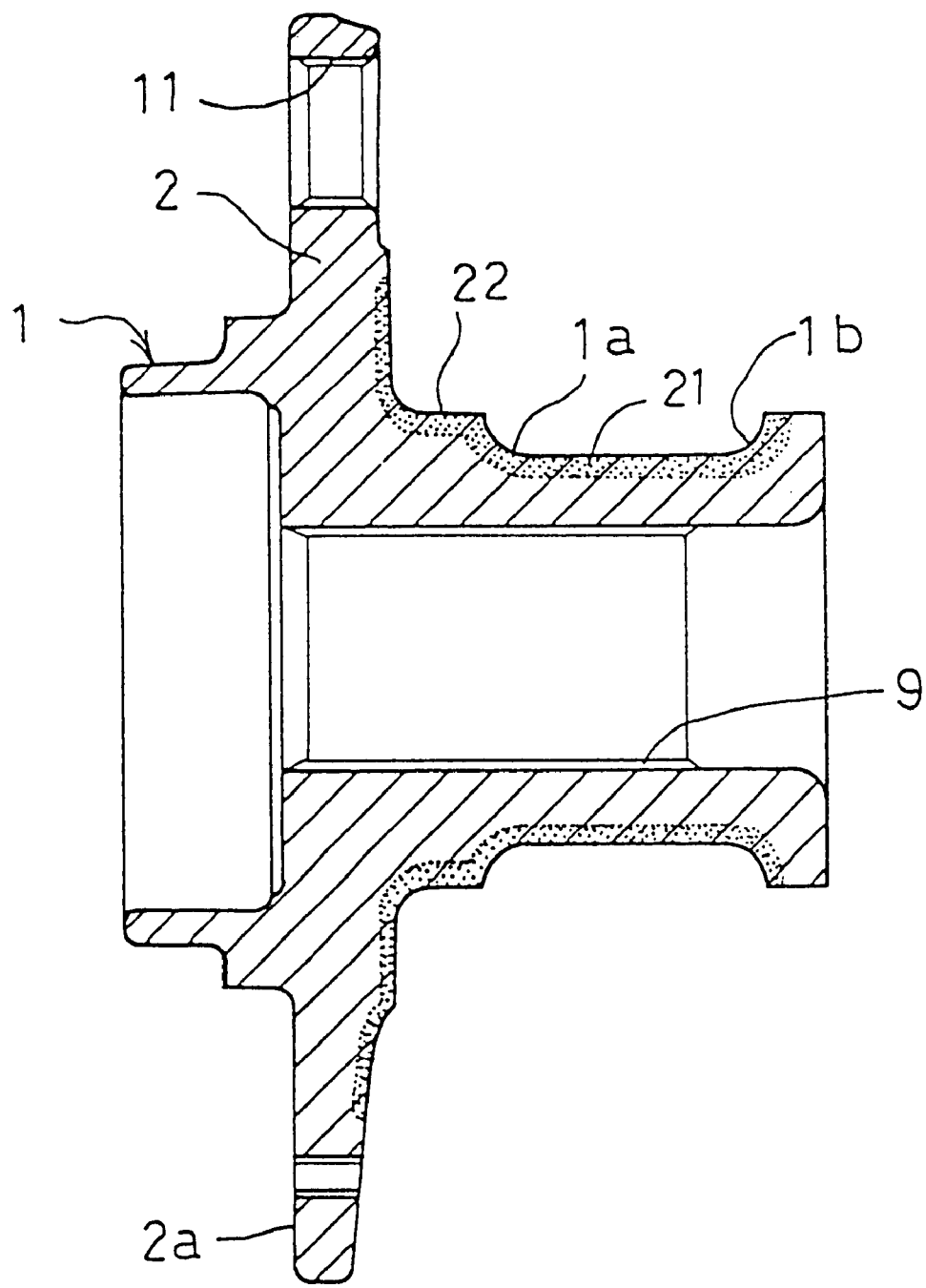
FIG. 14 is a sectional view of the inner member of the ninth embodiment.

The automotive wheel bearing assembly shown in FIG. 13 is a wheel bearing assembly for a driving wheel, which is a ninth embodiment of this invention. It differs from the eighth embodiment in that the inner raceway 1b is directly formed on the outer circumferential surface of the inner member 1 together with the outer raceway 1a. In this embodiment, as shown in FIG. 14, the outer and inner raceways 1a, 1b directly formed on the outer surface of the inner member 1 are hardened by heat treatment, and the heat-affected layer of the hardened layer 21 is restricted so as to extend beyond the seal land portion 22 but not reach the bolt holes 11 for hub bolts 7 formed in the wheel mounting flange 2.

(Tenth Embodiment)

Figure 15:
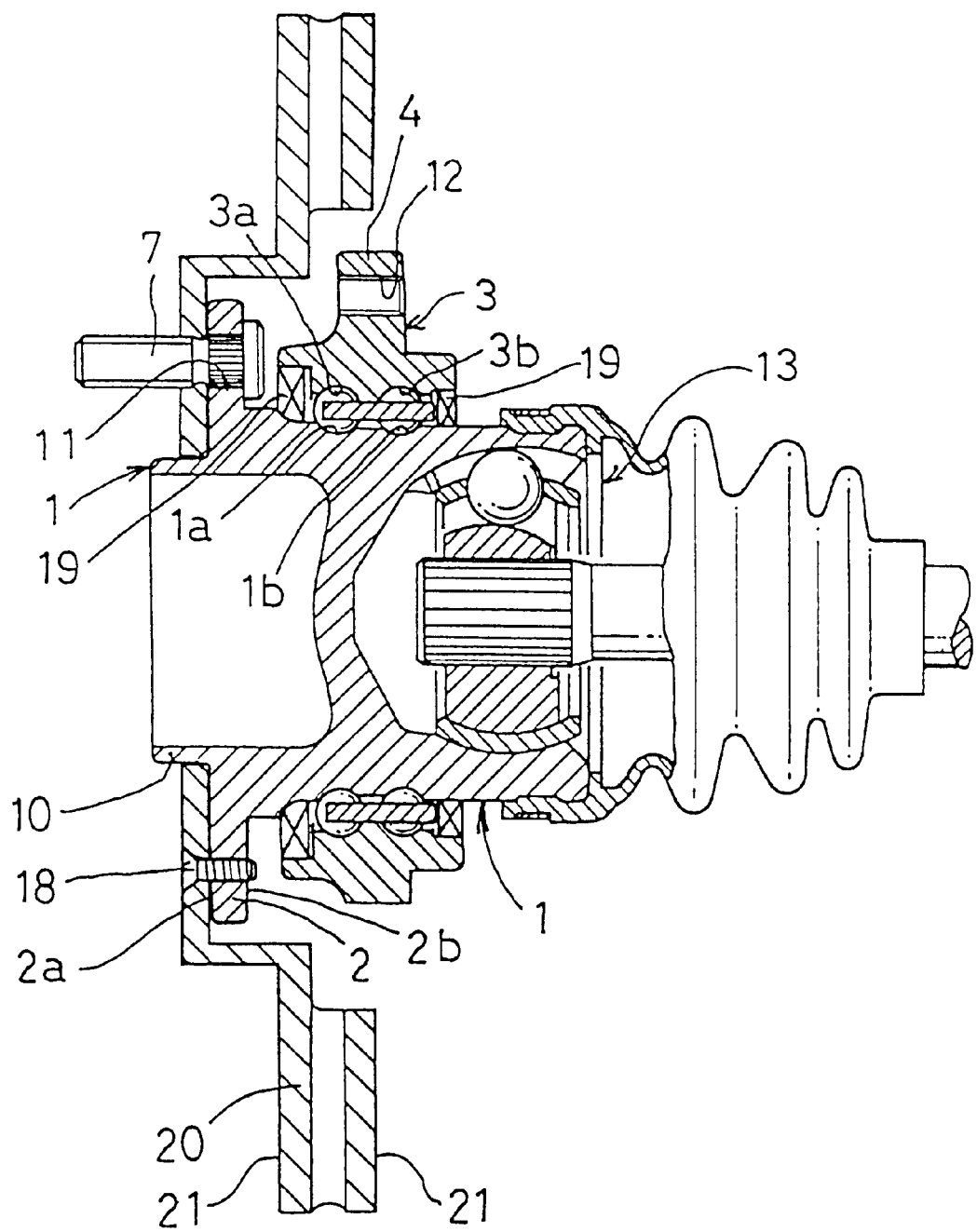
FIG. 15 is a sectional view of a tenth embodiment.

The automotive bearing assembly shown in FIG. 15 is a wheel bearing assembly for a driving wheel which is a tenth embodiment of this invention. It has an inner member 1 formed integrally with an outer ring of a constant-velocity joint. Its structure is substantially the same as the embodiment shown in FIG. 2.

Figure 16:
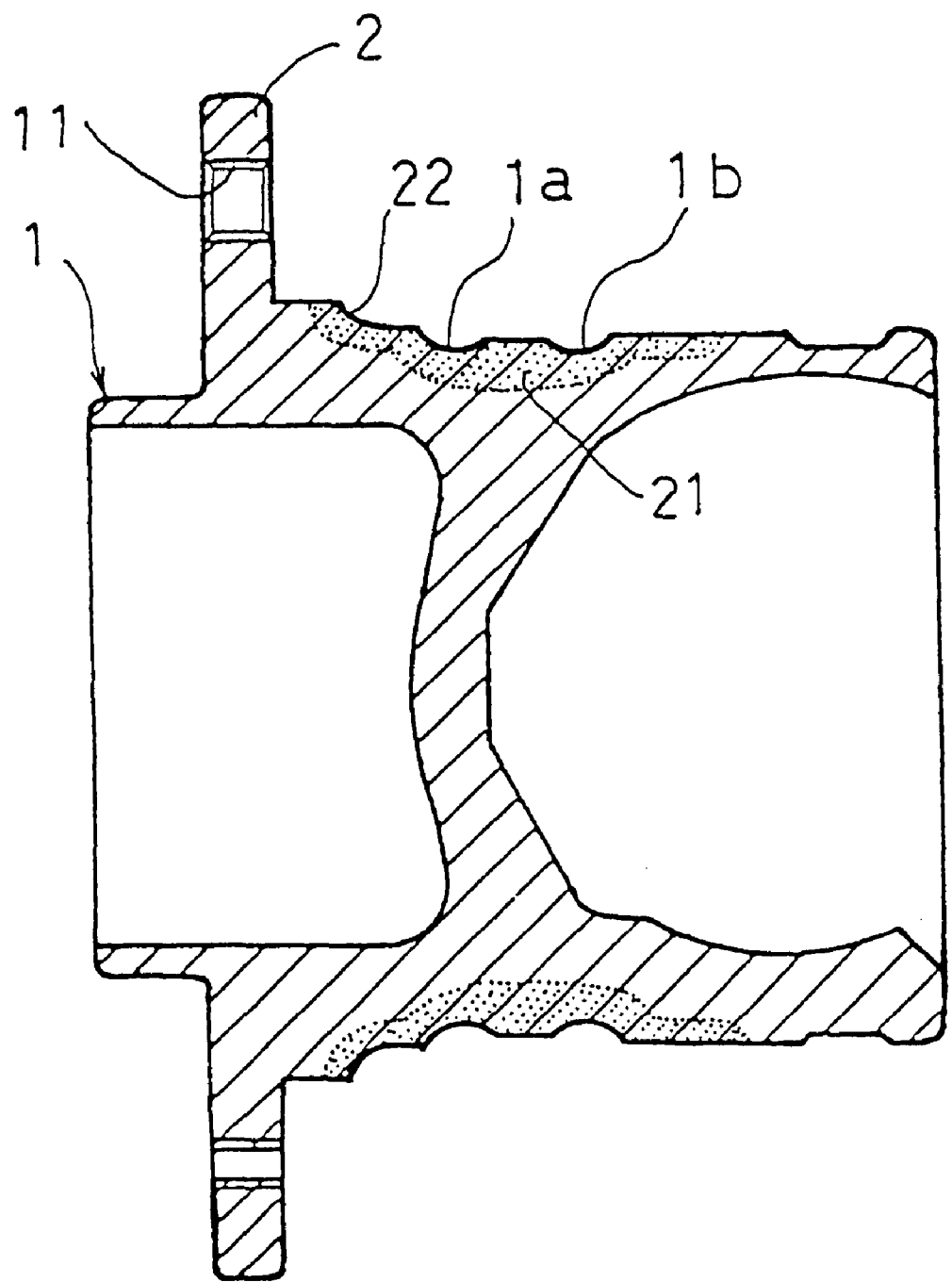
FIG. 16 is a sectional view of the inner member of the tenth embodiment.

In this embodiment too, the inner raceway 1b is formed directly on the outer surface of the inner member 1 together with the outer raceway 1a. In this embodiment, as shown in FIG. 16, when the raceways 1a, 1b of the inner member 1 formed are hardened, care is taken so that the heat-affected layer of the hardened layer 21 will extend beyond the seal land portion 22 but not reach the bolt holes 11 for hub bolts 7 formed in the wheel mounting flange 2.

(11th Embodiment)

Figure 17:
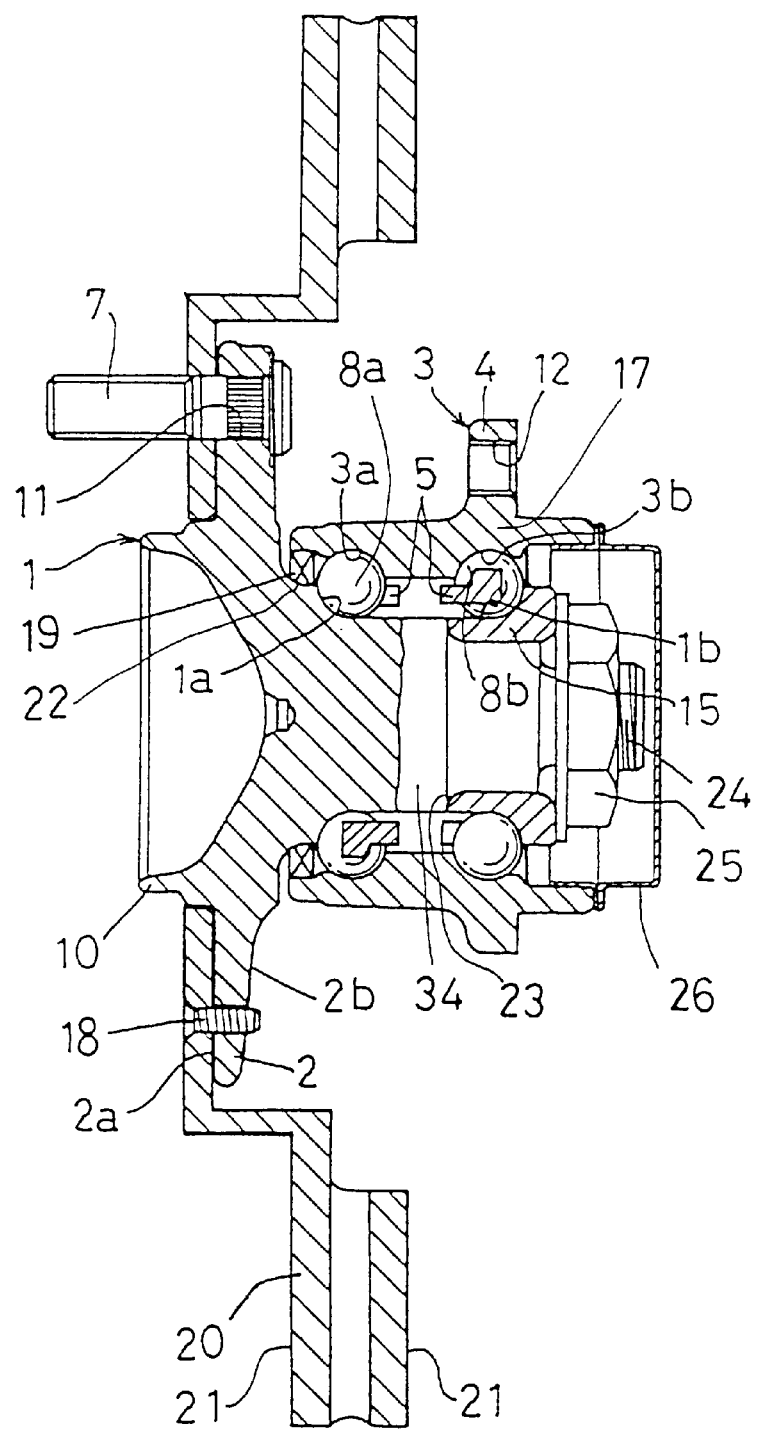
FIG. 17 is a sectional view of a 11th embodiment.

The automotive wheel bearing assembly shown in FIG. 17 is a wheel bearing assembly for a non-driving wheel, which is an eleventh embodiment of this invention.

This wheel bearing assembly has the same structure as the embodiment of FIG. 5. The inner member 1 is formed with the wheel mounting flange 2 having a surface for fixing a brake rotor 20, and a shaft portion 34 extending from the wheel mounting flange 2 along the axial direction toward the inner side.

The wheel mounting flange 2 is formed with bolt holes 11 into which wheel-fixing hub bolts 7 are to be pressed.

On the outer circumferential surface of the inner member 1, a seal land portion 22 for attaching a seal 19, a raceway 1a for the outer rolling elements 8a, and a shoulder 23 for receiving a separate inner ring 15 formed with an inner raceway 1b for the inner rolling elements 8b are integrally formed. At the inner end of the inner member 1, a threaded portion 24 is formed. By tightening with a nut 25, the inner ring 15 is fixed, so that the bearing assembly is given rigidity due to a preload.

The outer member 3 comprises an outer ring 17 on which are directly formed two raceways 3a, 3b. On the outer ring 17, a flange 4 having bolt holes 12 for fixing to a knuckle extending from the car body is directly formed.

On the outer side of the two raceways 3a, 3b of the outer member 3, a seal 19 is mounted, and the inner side is sealed by a hub cap 26.

Figure 18:
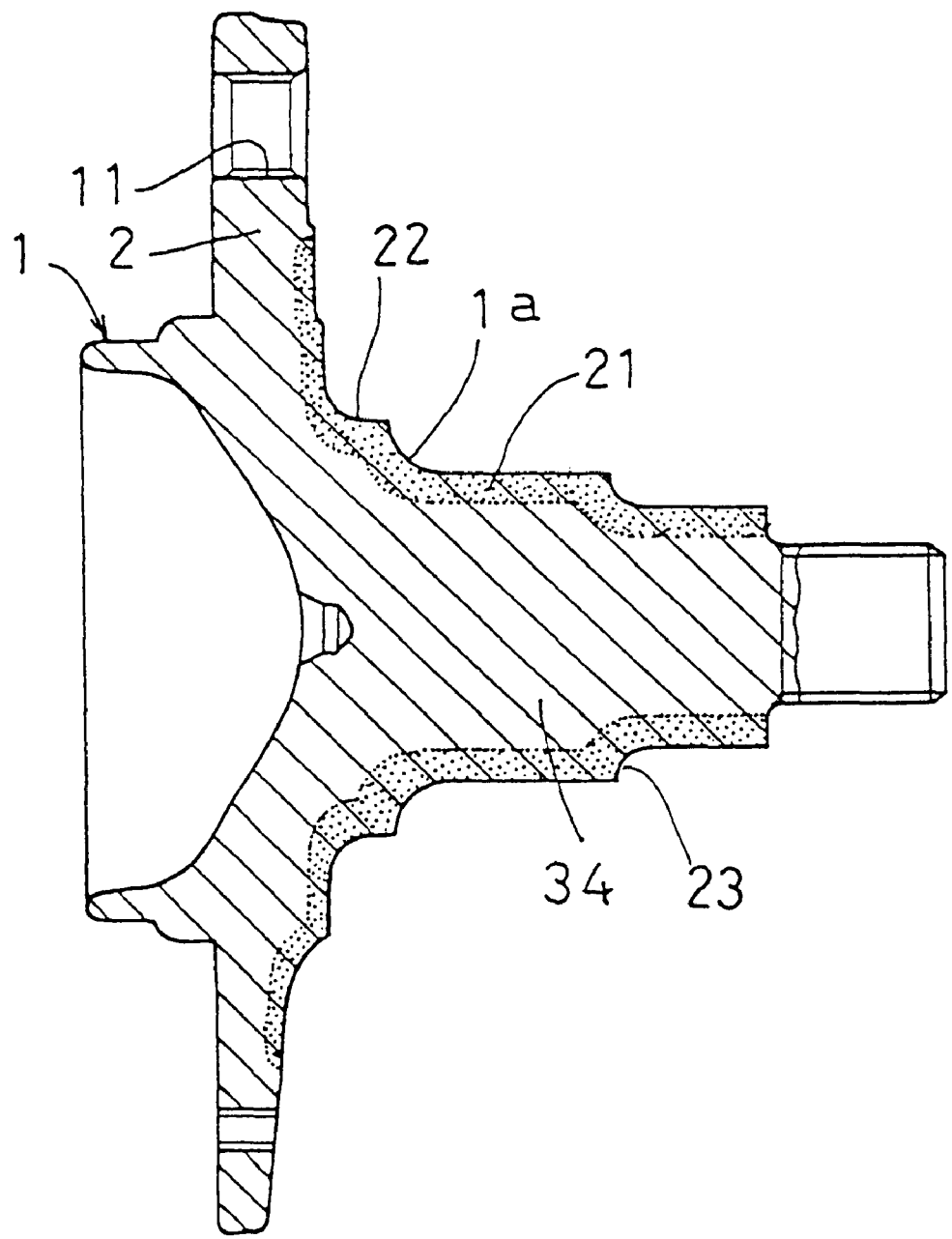
FIG. 18 is a sectional view of the inner member of the 11th embodiment.

On the raceway 1a formed on the outer circumferential surface of the inner member 1, a hardened layer 21 is formed by heat treatment as shown in FIG. 18.

Heat treatment may be carried out by high-frequency heating. In the 8 to 11th embodiment, its depth is restricted such that the heat-affected layer of the hardened layer 21 will extend beyond the seal land portion 22 but not reach the bolt holes 11 for hub bolts 7 formed in the wheel mounting flange 2.

Its depth at the raceway 1a should be within the range of 0.7–4 mm at the deepest portion, and the depth at the seal land portion 22 is shallower than at the raceway 1a and should be 0.3–2 mm at the deepest portion.

In the following 12th to 20th embodiments, a brake rotor fixing surface on one side of the wheel mounting flange is finished to finer surface roughness than the other side.

(12th Embodiment)

This embodiment has the same structure as the embodiment of FIG. 1. In this embodiment, an outer side 2a of the wheel mounting flange 2 to which the brake rotor 20 is to be fastened is finished to fine surface roughness of 3 Ra or less by secondary cutting. The surface roughness of the other side is 3 to 6 Ra. By secondary cutting, the surface accuracy of the side 2a improves, so that the runout of the side 21 of the brake rotor 20 to be fastened to this side is suppressed.

(13th Embodiment)

Figure 19:
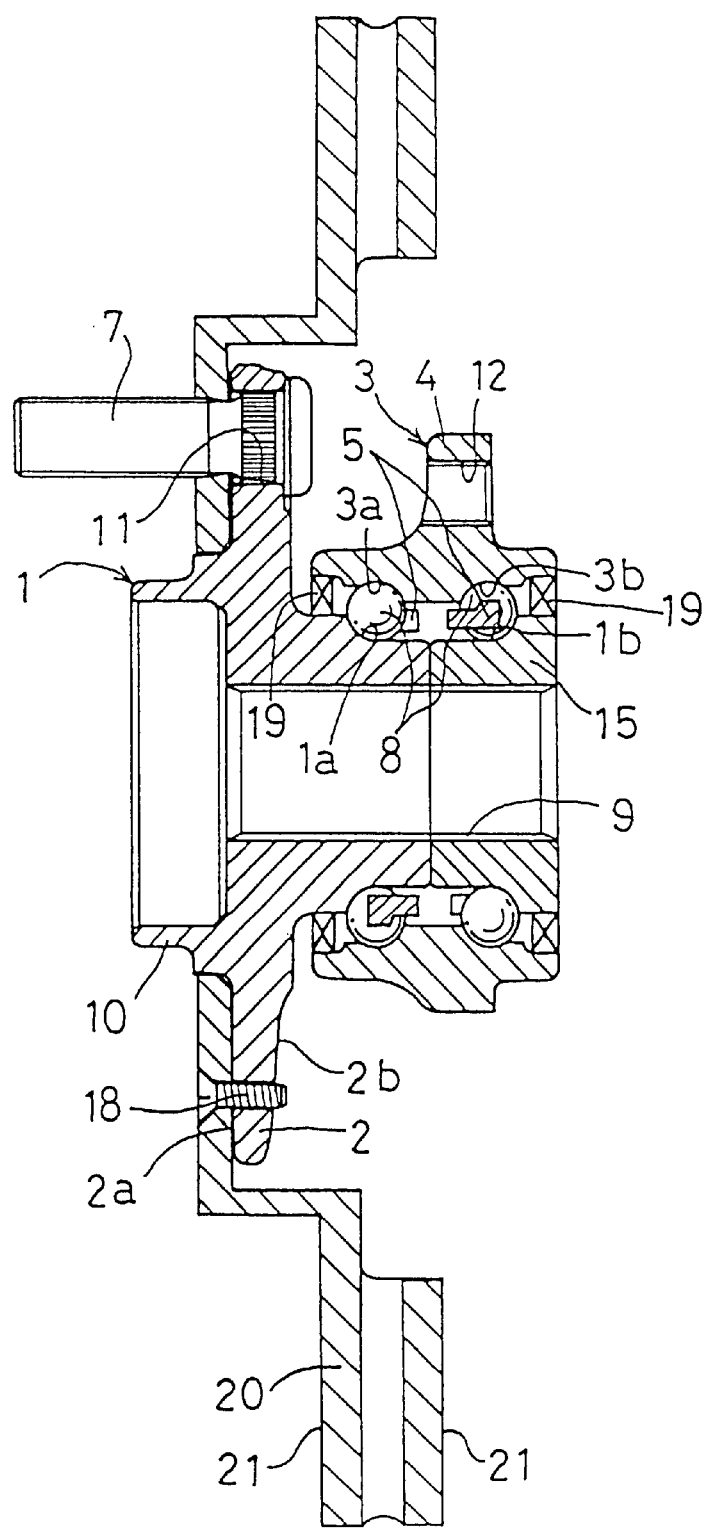
FIG. 19 is a sectional view of a 13th embodiment.

The wheel bearing assembly shown in FIG. 19 is a wheel bearing assembly for a driving wheel, which is a 13th embodiment of this invention. The separate inner ring 15 is pressed onto the wheel axle of a constant-velocity joint, not on the inner member 1 as in the 12th embodiment.

(14th Embodiment)

This embodiment has the same structure as the embodiment of FIG. 2, in which the inner member 1 is formed to be integral with the outer ring of a constant-velocity joint. In this embodiment, a brake rotor 20 is fixed to the side 2a of the flange 2 by bolts 18. In the 13th and 14th embodiments, the outer side 2a to which the brake rotor 20 is to be fastened is finished to fine surface roughness of 3 Ra or less by secondary cutting. For the subsequent embodiments too, the side 2a of the wheel mounting flange 2 to which the brake rotor is to be fastened is finished to 3 Ra or less by secondary cutting, and thus finished more finely than the other side 2b, which has a surface roughness of 3–6 Ra by primary cutting.

(15th Embodiment)

Figure 20:
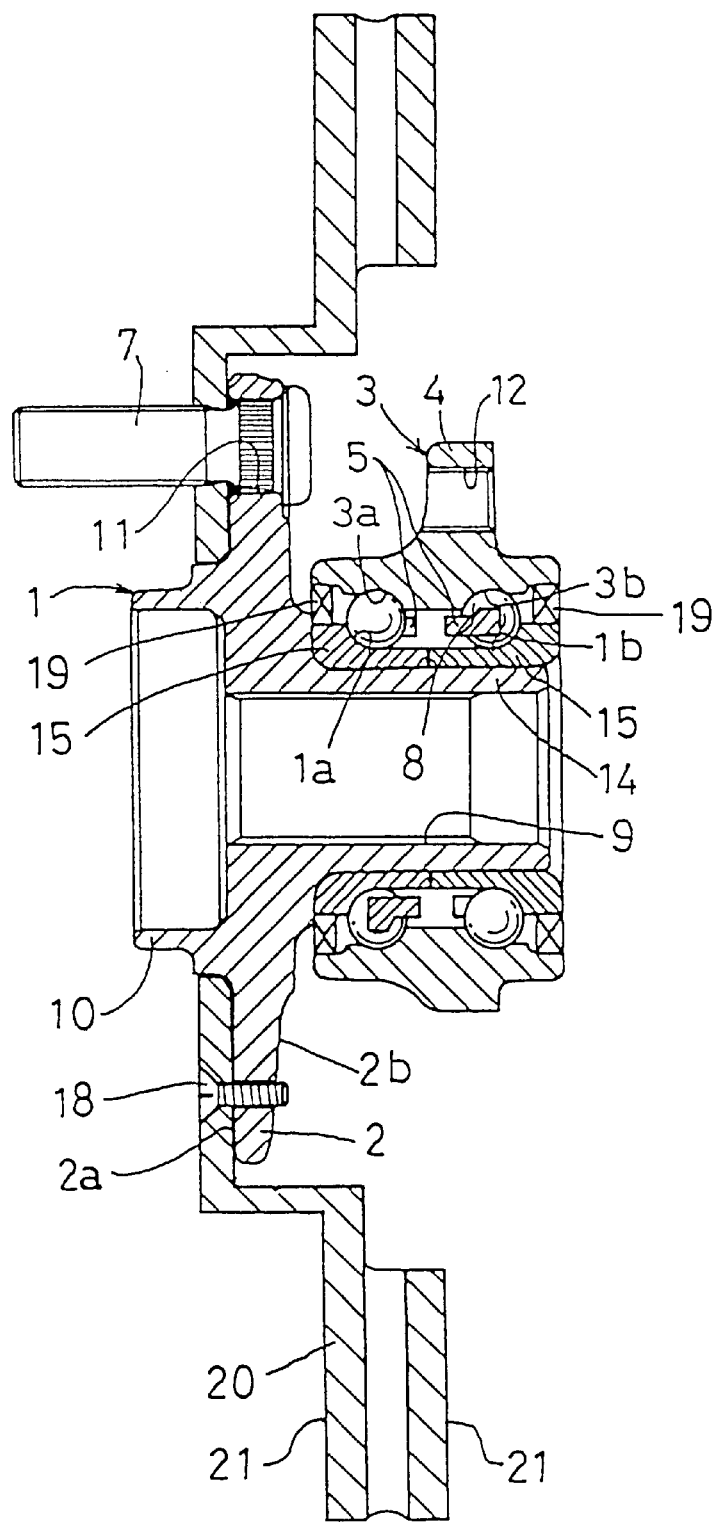
FIG. 20 is a sectional view of a 15th embodiment.

The wheel bearing assembly shown in FIG. 20 is also a wheel bearing assembly for a driving wheel and is a 15th embodiment of this invention. The two raceways 1a, 1b of the inner member 1 are formed on two separate inner rings 15. The inner member 1 has a wheel mounting flange 2 having a side 2a to which is fixed a brake rotor 20 by bolts 18. This embodiment is the same in structure as the embodiment of FIG. 3.

(16th Embodiment)

Figure 21:
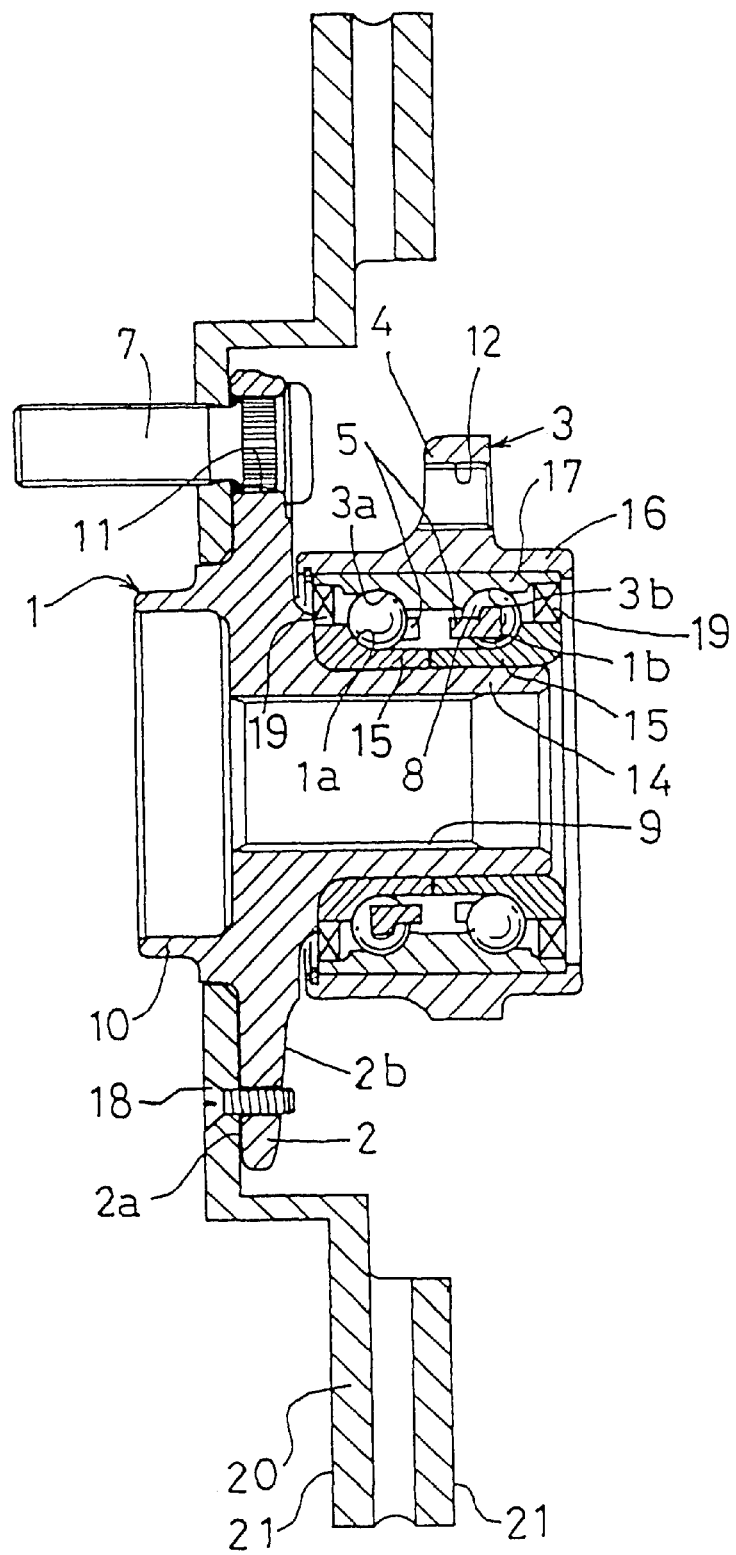
FIG. 21 is a sectional view of a 16th embodiment.

The wheel bearing assembly shown in FIG. 21 is also a wheel bearing assembly for a driving wheel, which is a 16th embodiment of this invention. Like the embodiment shown in FIG. 3, the inner member 1, which is mounted on a drive shaft, has its two raceways 1a, 1b formed on two separate inner rings 15. Also, like the embodiment shown in FIG. 4, the outer member 3 comprises a housing 16 formed with a flange 4 having bolt holes 12 and adapted to be fixed to the car body, and an outer ring 17 formed with two raceways 3a, 3b.

(17th Embodiment)

Figure 22:
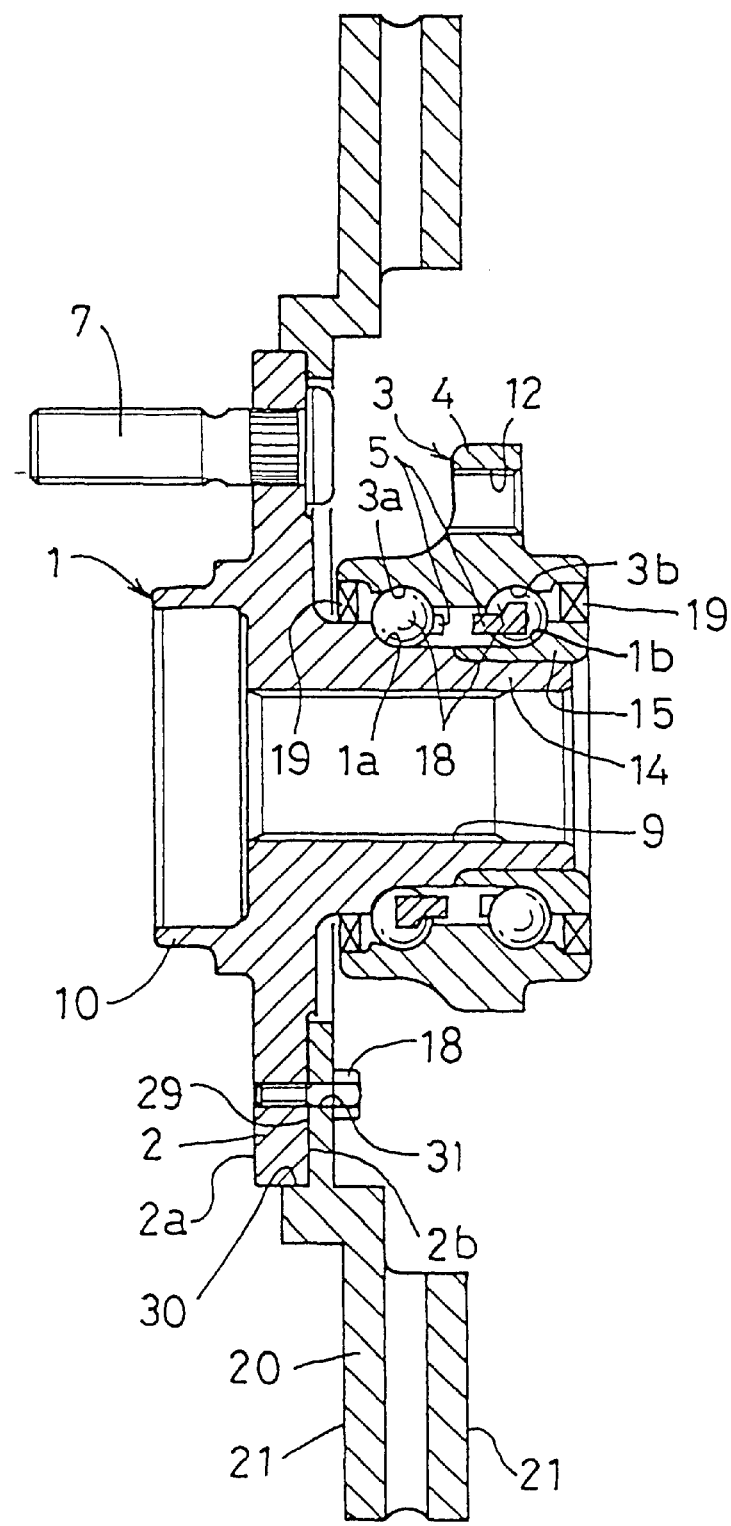
FIG. 22 is a sectional view of a 17th embodiment.
Figure 23:
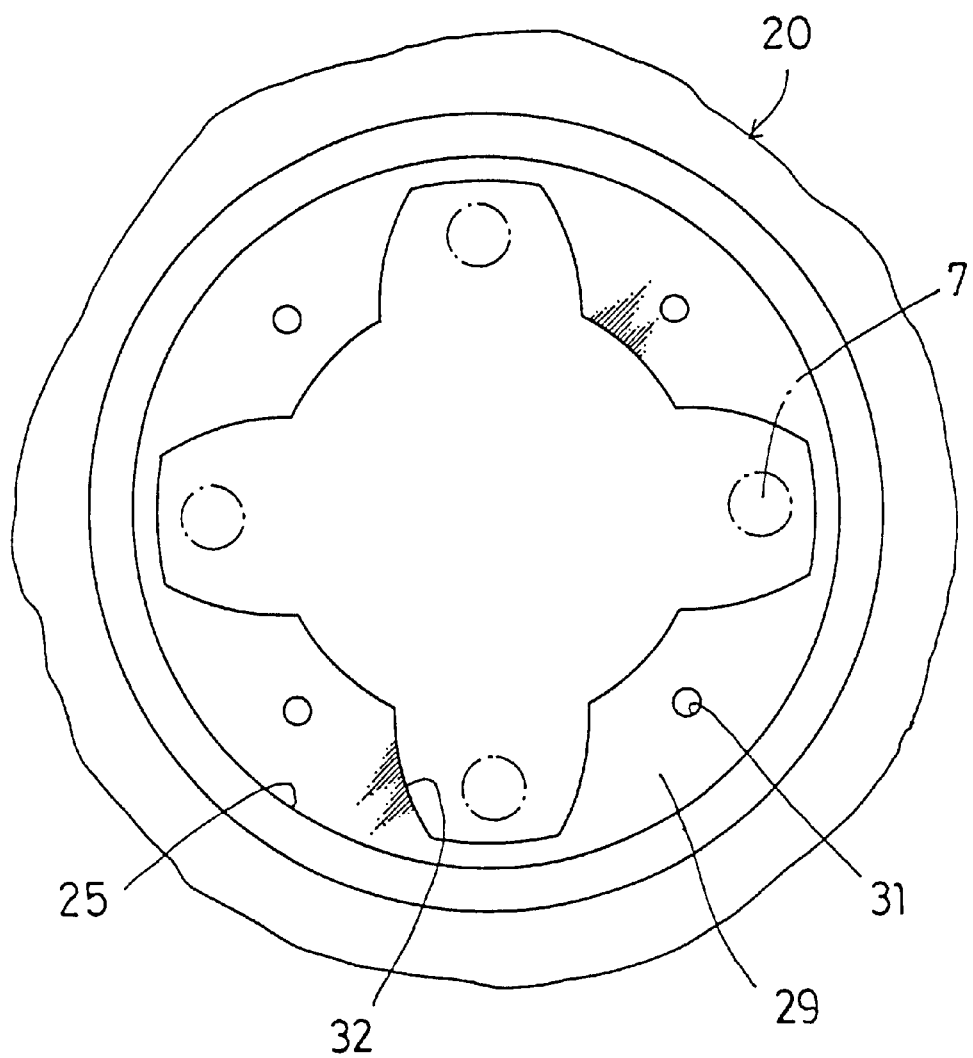
FIG. 23 is a front view showing a portion of a brake rotor of the same.

The wheel bearing assembly shown in FIG. 22 is a wheel bearing assembly for a driving wheel, which is a 17th embodiment of this invention, in which a brake rotor 20 is fixed to the inner side 2b of the wheel mounting flange 2.

If the brake rotor 20 is mounted to the inner side of the wheel mounting flange 2 as in this embodiment, since the inner side is not a wheel mounting surface, the mounting surface 29 of the brake rotor 20 is, as shown in FIG. 22, is formed with a shoulder 30 so that the outer circumferential surface of the wheel mounting flange 2 of the inner member 1 serves as a brake pilot for the brake rotor. On the mounting surface 29 of the brake rotor 20, only holes 31 for bolts 18 for fixing the brake rotor 20 are formed, and cutouts 32 are formed to prevent the hub bolts 7 from interfering with the mounting surface 29. By forming the cutouts 32 in the mounting surface 29 of the brake rotor 20, when nuts are tightened onto the hub bolts 7, even if the wheel is deformed axially, the brake rotor 20 will not be affected at all, so that it is possible to suppress the runout of the brake rotor 20. In this embodiment, the inner side 2b is finished more finely than the outer side 2a, i.e. to 3 Ra or under by secondary cutting.

As in this embodiment, mounting the brake rotor 20 to the inner side of the wheel mounting flange is applicable to the other embodiments too. In such a case, the inner side 2b of the wheel mounting flange 2 should be finished to finer surface roughness than the outer side 2a, i.e. to 3 Ra or under.

(18th Embodiment)

This embodiment is a wheel bearing assembly for a non-driving wheel, which is the same in structure as the embodiments of FIG. 17. Of the two raceways 1a, 1b of the inner member 1, the outer raceway 1a is formed directly on its outer surface, while the inner raceway 1b is formed on a separate inner ring 15 mounted on the inner end of the inner member. The inner member 1 is integrally formed with a wheel mounting flange 2. To the side 2a of the wheel mounting flange 2, a brake rotor 20 is fixed by bolts 18. The side 2a is finished to surface roughness of 3 Ra or under by secondary cutting. Also, the outer member 3 has two raceways 3a, 3b formed directly on its inner circumferential surface, and has on the outer circumferential surface a flange 4 having bolt holes 12 for fixing to the car body. A threaded portion 24 is formed on the inner side of the inner member 1. By tightening with a nut 25, the inner ring 15 is fixed to give the bearing a preload and increase bearing rigidity. Further, the inner side is sealed by a hub cap 26.

(19th Embodiment)

Figure 24:
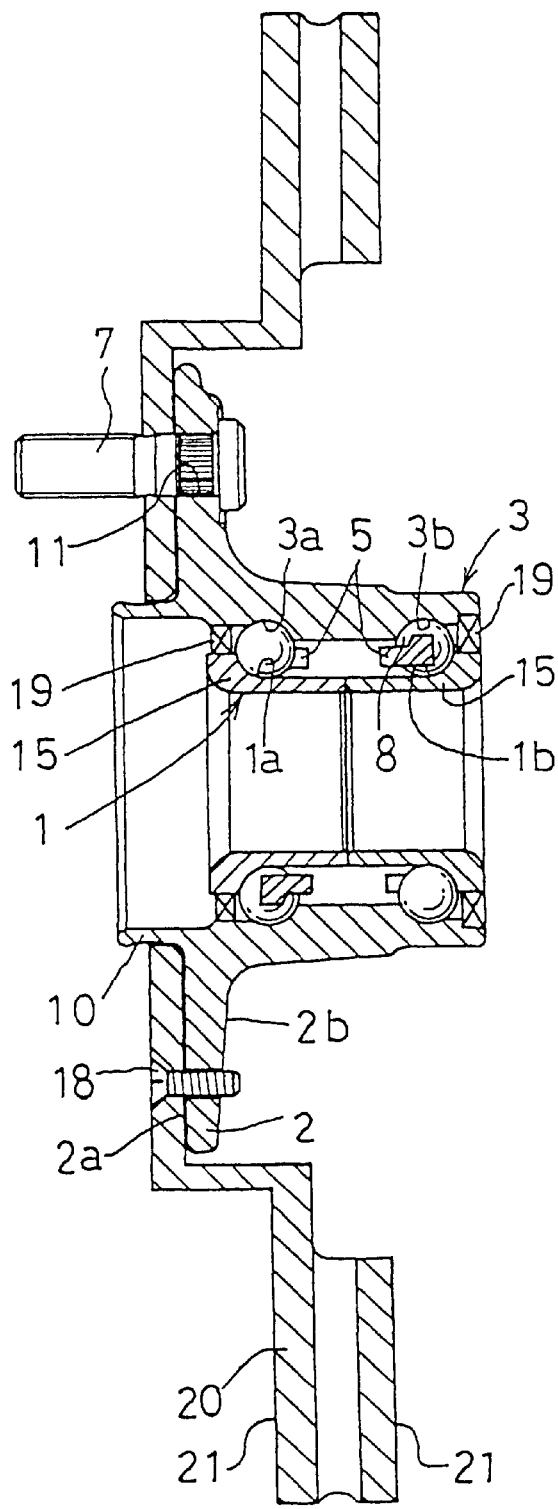
FIG. 24 is a sectional view of a 19th embodiment.

The wheel bearing assembly shown in FIG. 24 is a wheel bearing assembly for a non-driving wheel, which is a 19th embodiment of this invention. This embodiment has the same structure as the embodiments of FIG. 6 and has a wheel mounting flange 2 on the outer member 3, and has two raceways 3a, 3b directly formed on the inner surface of the outer member 3. Inside the outer member 3, an inner member 1 (with inner rings 15) having raceways 1a, 1b on the outer surface is provided. A brake rotor 20 is fixed to the outer side 2a of the wheel mounting flange 2 of the outer member 3.

(20th Embodiment)

Figure 25:
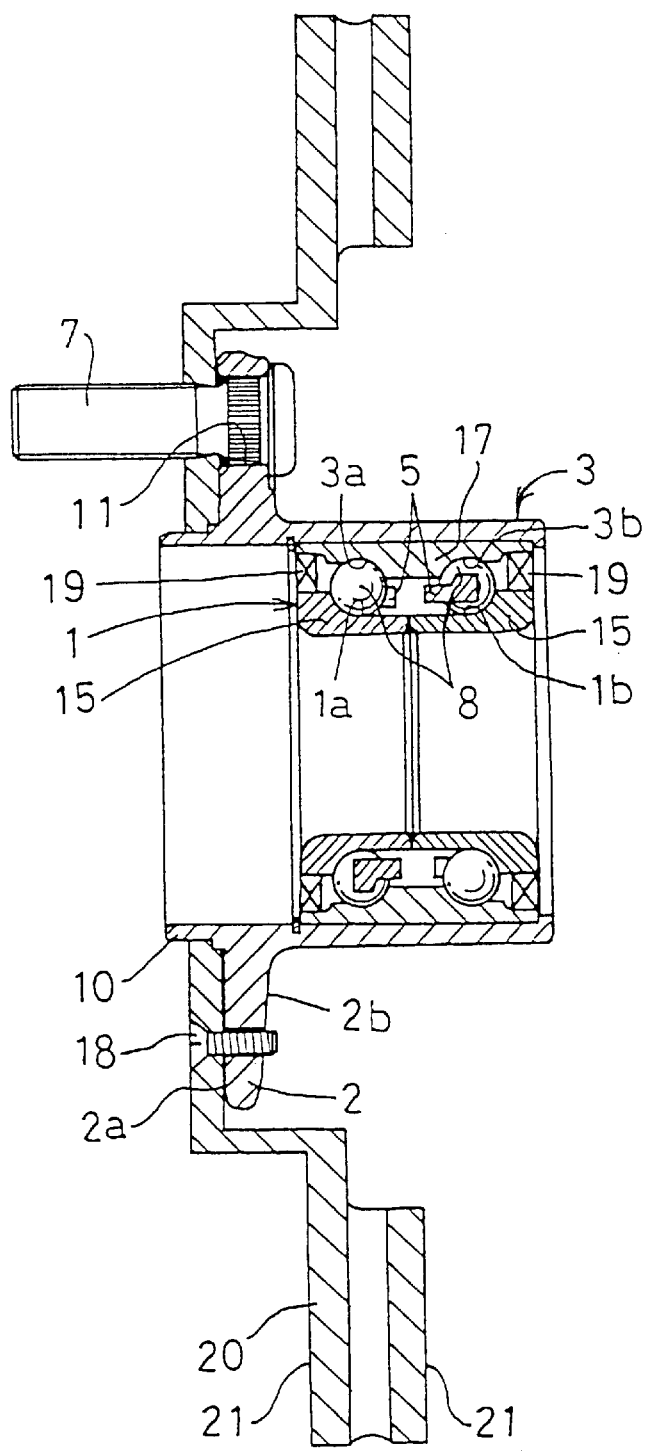
FIG. 25 is a sectional view of a 20th embodiment.

The wheel bearing assembly shown in FIG. 25 is a 20th embodiment of this invention. It has the same structure as the embodiment of FIG. 7. It has its outer member 3 formed by pressing in a separate outer ring 17 having two raceways 3a, 3b on its inner surface and having a wheel mounting flange 2. An inner member 1 (with inner rings 15) formed with raceways 1a, 1b on its outer surface is provided inside the outer member 3 through rolling elements 8.

In the embodiments of FIGS. 24 and 25, the outer side 2a of the wheel mounting flange 2 for fixing the brake rotor 20 is finished to surface roughness of 3 Ra or under by secondary cutting.

Also, in each of the 12th to 20th embodiments, secondary cutting of the side 2a or 2b of the wheel mounting flange 2 is carried out after the inner member 1 or outer member 3 subjected to primary cutting has been heat-treated.

In the wheel bearing assembly according to this invention, since the brake rotor fixing surface on one side of the wheel mounting flange is finished to finer surface roughness than the other side, it is possible to suppress runout of the brake rotor.

Figure 26:
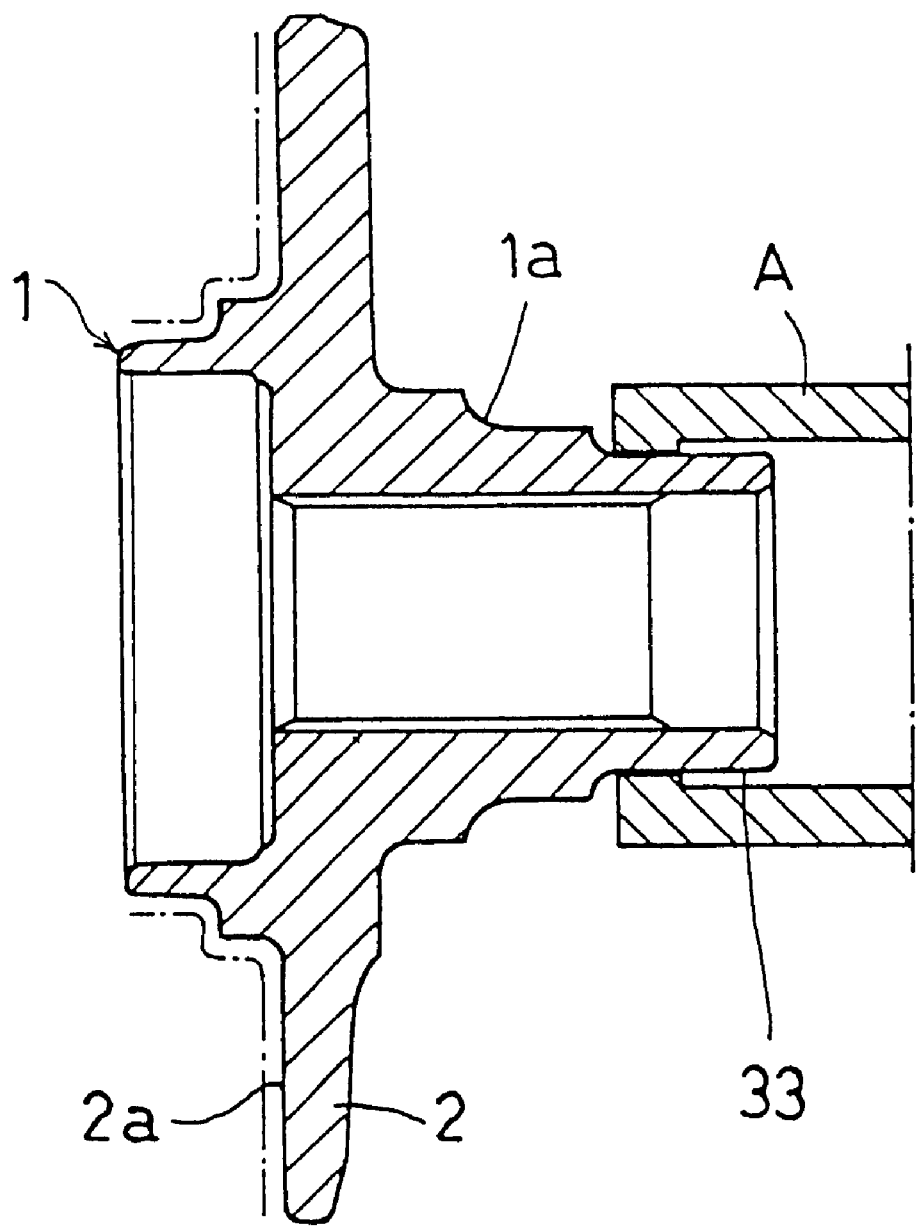
FIG. 26 is a view showing a finishing step by secondary turning.

Next, the method according to this invention shall be described. In this method, after the raceway 1a on the inner member 1 and outer circumferential surface at an inner end 33 of the inner member 1 having a wheel mounting flange 2 have been formed by primary turning, they are subjected to induction hardening. Then, as shown in FIG. 26, the inner end formed by turning coaxially with the raceway 1a of the inner member 1 is fixed to a chucking device A of an NC lathe, and a side 2a of the wheel mounting flange 2 on which a brake rotor 20 is to be mounted is subjected to secondary turning. This means that the secondary turning is carried out with the raceway as a reference.

The automotive wheel bearing assembly manufactured by the method according to this invention comprises, as shown e.g. in FIG. 11, an outer member 3 having two raceways 3a, 3b on its inner circumferential surface, an inner member 1 having raceways 1a, 1b opposite the raceways 3a, 3b, and rolling elements 8 disposed between the outer member 3 and the inner member 1 in two rows. The inner member 1 has a wheel-mounting flange 2. A brake rotor 20 is fastened to the side 2a of the wheel mounting flange 2 by bolts 18. Specifically, there are ones for a driving wheel, in which the drive shaft of a constant-velocity joint is mounted, as shown in FIGS. 11, 13, 19, 15, 20, 21 and 22, and ones for a non-driving wheel, in which no drive shaft is mounted as shown in FIGS. 17, 24 and 25.

The method according to this invention is applicable to the wheel bearing assembly shown in FIG. 11. In this embodiment, an outer side 2a of the wheel mounting flange 2 to which the brake rotor 20 is to be fastened is finished to fine surface roughness of 3 Ra or under by secondary turning. The surface roughness of the other side is 3–6 Ra, which is obtained by primary turning.

The method according to this invention is also applicable to the wheel bearing assembly shown in FIG. 19 which is a wheel bearing assembly for a driving wheel. The separate inner ring 15 in this embodiment is structured to be pressed onto the wheel axle of a constant-velocity joint. In this embodiment, too, the outer side 2a to which the brake rotor 20 is to be fixed is subjected to secondary turning.

The method according to this invention is also applicable to the wheel bearing assembly shown in FIG. 15 which is a wheel bearing assembly for a driving wheel. In this embodiment, a brake rotor 20 is fixed to the side 2a of the flange 2 by bolts 18, and the outer side 2a to which the brake rotor 20 is to be fastened is finished to fine surface roughness of 3 Ra or under by secondary turning with the raceway 1*a* of the inner member 1 as a reference.

The method according to this invention is also applicable to the wheel bearing assembly shown in FIG. 20 which is a wheel bearing assembly for a driving wheel. The two raceways 1*a*, 1*b* of the inner member 1 are formed on two separate inner rings 15. In this embodiment, too, the side 2*a* of the wheel mounting flange 2 is subjected to secondary turning.

The method according to this invention is also applicable to the wheel bearing assembly shown in FIG. 21 which is a wheel bearing assembly for a driving wheel. In this embodiment too, the side 2*a* of the wheel mounting flange 2 of the inner member 1 is subjected to secondary turning.

The method according to this invention is also applicable to the wheel bearing assembly shown in FIG. 22 which is a wheel bearing assembly for a driving wheel, in which a brake rotor 20 is fixed to the inner side of the wheel mounting flange 2. In this embodiment, too, the inner side 2*b* is finished more finely than the outer side 2*a*, i.e. 3 Ra or under by secondary turning.

Mounting the brake rotor 20 to the inner side of the wheel mounting flange as in this embodiment is applicable to the other embodiments too. In such a case, the inner side 2*b* of the wheel mounting flange 2 is finished to finer surface roughness than the outer side 2*a*, i.e. 3 Ra or under by secondary turning with the raceway 1*a* of the inner member 1 as a reference.

The method according to this invention is also applicable to the wheel bearing assembly shown in FIG. 17 which is a wheel bearing assembly for a non-driving wheel. The side 2*a* of the wheel mounting flange 2 is finished to surface roughness of 3 Ra or under by secondary cutting with the raceway 1*a* of the inner member 1 as a reference. By the way, a threaded portion 24 is formed on the inner side of the inner member 1. By tightening with a nut 25, the inner ring 15 is fixed to give the bearing a preload and increase bearing rigidity. Further, the inner side is sealed by a hub cap 26.

The method according to this invention is also applicable to the wheel bearing assembly shown in FIG. 24 is a wheel bearing assembly for a non-driving wheel. In this embodiment, a brake rotor 20 is fixed to the outer side 2*a* of the wheel mounting flange 2 of the outer member 3.

The method according to this invention is also applicable to the wheel bearing assembly shown in FIG. 25. In this embodiment, too, a brake rotor 20 is fixed to the outer side 2*a* of the wheel mounting flange 2 of the outer member 3 by bolts 18.

In the embodiments of FIGS. 24 and 25, the outer side 2*a* of the wheel mounting flange 2 for fixing the brake rotor 20 is finished to surface roughness of 3 Ra or under by secondary cutting with the raceways 3*a*, 3*b* of the outer member 3 as a reference.

Also, in each of the above embodiments, secondary turning of the side 2*a* or 2*b* of the wheel mounting flange 2 is carried out after the outer member 3 subjected to primary cutting has been subjected to induction hardening. Since the inner circumferential surface subjected to turning coaxially with the raceways 3*a*, 3*b* of the outer member 3 is chucked and subjected to secondary turning, the side 2*a* is subjected to turning with the raceways as a reference.

In the wheel bearing assembly according to this invention, since the brake rotor fixing surface on one side of the wheel mounting flange is finished to fine surface roughness by secondary turning with the raceways as a reference, it is possible to obtain a high-quality wheel bearing assembly with the runout of the brake rotor suppressed.

Next, embodiments of wheel bearing assembly for driven wheels in which is mounted the constant-velocity joint according to this invention are described.

Figure 27:
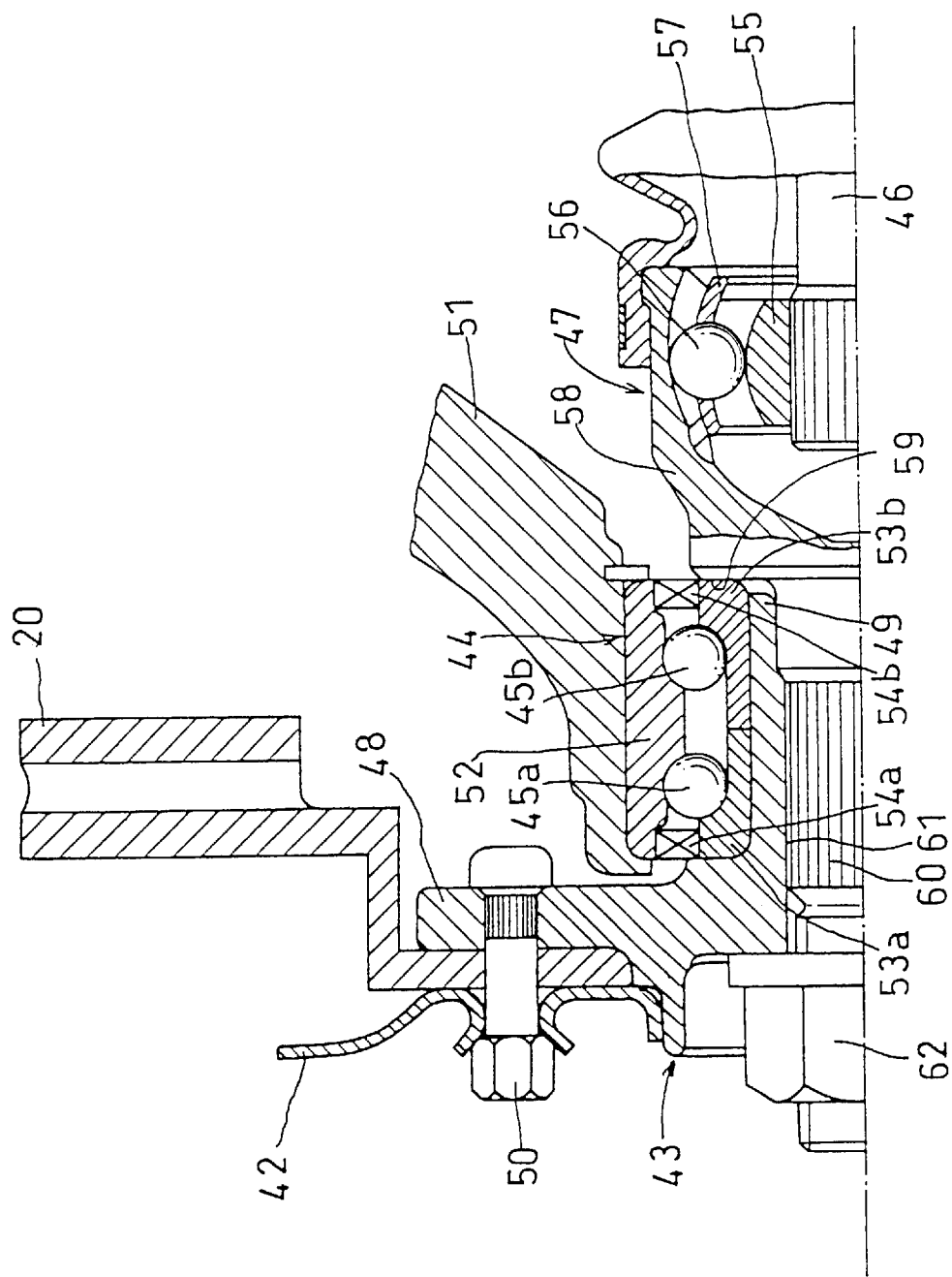
FIG. 27 is a partial sectional view showing another embodiment of a wheel bearing assembly for a driven wheel in which is mounted a constant-velocity joint according to this invention.

The wheel bearing assembly for a driven wheel shown in FIG. 27 is another embodiment of this invention, and comprises a wheel-mounting hub 43 on which is mounted a wheel 42 together with a brake rotor 20, an axle bearing 44 rotatably supporting the wheel-mounting hub 43 through double-row rolling elements 45*a*, 45*a* and a constant-velocity joint 47 coupled to the wheel-mounting hub 43 for transmitting the power of a drive shaft 46 to the wheel-mounting hub 43.

The wheel-mounting hub 43 has a flange portion 48, and a shaft portion 49 extending from the flange portion 48 to the inner side in the axial direction. In the shaft portion 49, a shaft hole is formed therethrough. The wheel-mounting hub 43 is inserted in the brake rotor 20. On the flange portion 48, the wheel 42 is mounted by hub bolts 50 together with the brake rotor 20.

The axle bearing 44 is mounted on a knuckle 51 extending from the vehicle body, and comprises an outer ring 52 formed with double-row outer raceways, axially split type inner rings 53*a*, 53*b* formed with double-row inner raceways and arranged around the shaft portion 49 of the wheel-mounting hub 43, and double-row rolling elements 45*a*, 45*a* disposed between the inner rings 53*a*, 53*b* and the outer ring 52. Outside the double-row rolling elements 45*a*, 45*a*, seals 54*a*, 54*b* are provided.

The constant-velocity joint 47 comprises an inner ring 55 provided at one end of a drive shaft 46, torque-transmitting balls 56, a cage 57 for retaining the balls 56, and an outer ring 58.

Figure 28:
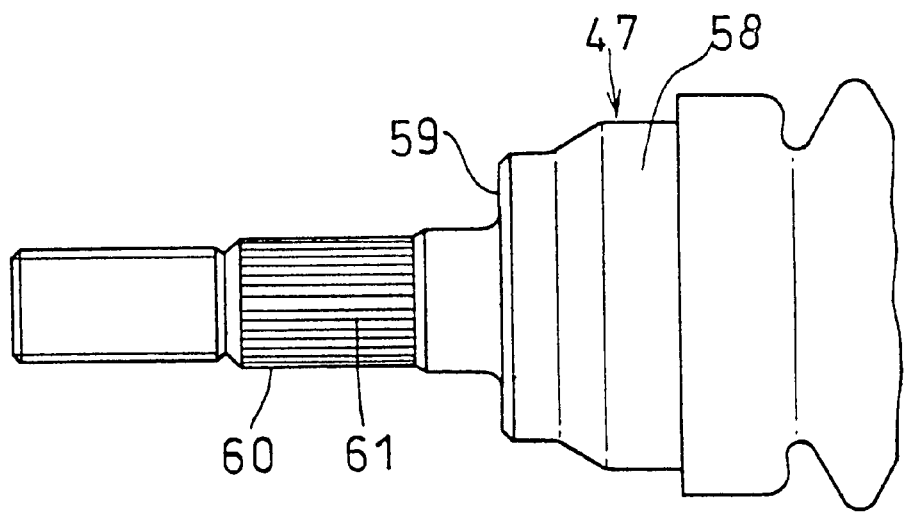
FIG. 28 is a partial view of the constant-velocity joint used in the embodiment.

At one end of the outer ring 58 of the constant-velocity joint 47, as shown in FIG. 28, a shoulder portion 59 which an end face of the inner ring 53*b* of the axle bearing 44 abuts, and a stem 60 are integrally formed. On the outer surface the stem 60 is formed with splines 61 adapted to engage the shaft portion 49 of the wheel-mounting hub 43.

The constant-velocity joint and the wheel-mounting hub 43 are assembled such that rotation torque is transmitted from the constant-velocity joint 47 to the wheel-mounting hub 43 by inserting the stem 60 of the joint 47 into the shaft portion 49 of the wheel-mounting hub 43, and spline-coupling them. Also, the tip of the stem 60 of the constant-velocity joint 47 is tightened to the wheel-mounting hub by a nut 62, to prevent the constant-velocity joint 47 from dropping, and give a predetermined set preload to the axle bearing 44.

In this embodiment, the runout width (i.e. variation) of a side of the shoulder portion 59 of the constant-velocity joint 47 on which the end face of the inner ring 53*b* of the axle bearing 44 abuts, and perpendicularity of the stem 60 relative to the axis are controlled within a predetermined value.

The predetermined value is 30 μm or under, preferably 8 μm or under.

Also, the side of the shoulder portion 59 of the constant-velocity joint 47 should be subjected to surface treatment to reduce frictional resistance. By this surface treatment, smooth sliding is obtained between the shoulder portion 59 of the joint 47 and the inner ring 53*b* of the axle bearing 44, so that stick-slip sound is more effectively suppressed.

Figure 29:
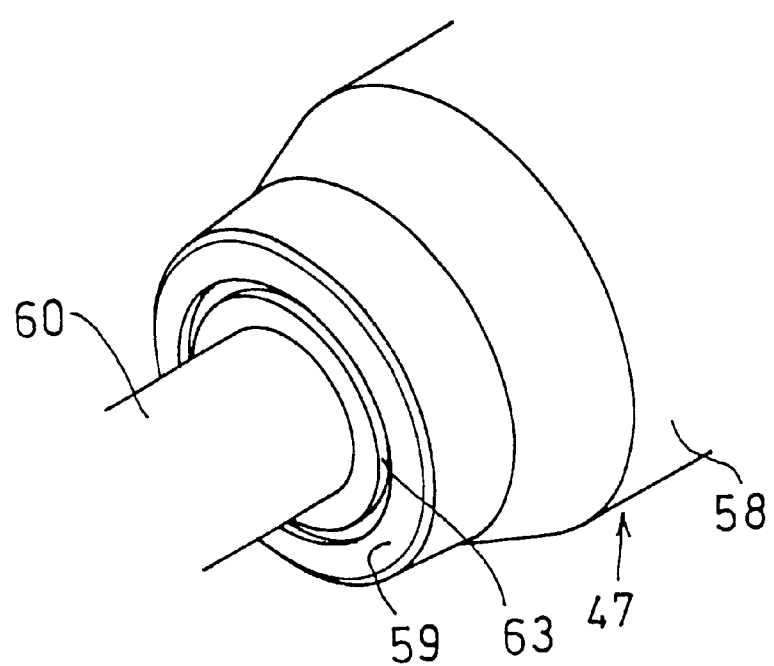
FIGS. 29–31 are perspective views showing examples of surface treatment applied to a shoulder portion of the constant-velocity joint.
Figure 30:
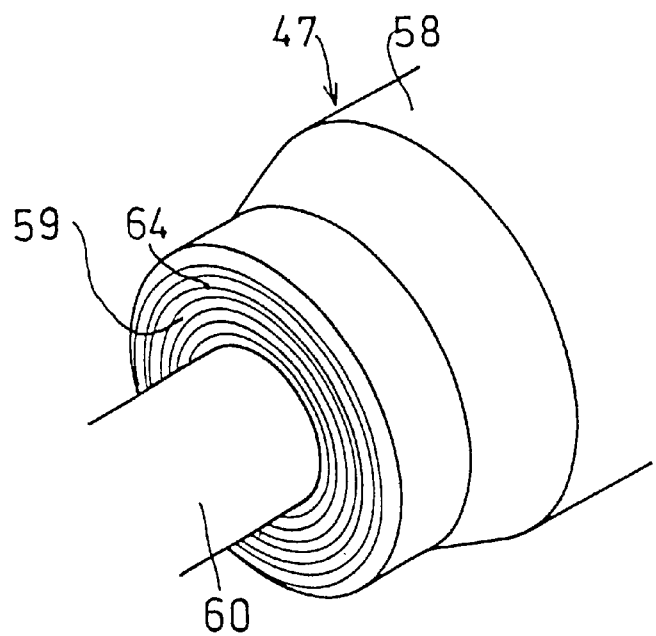
Figure 31:
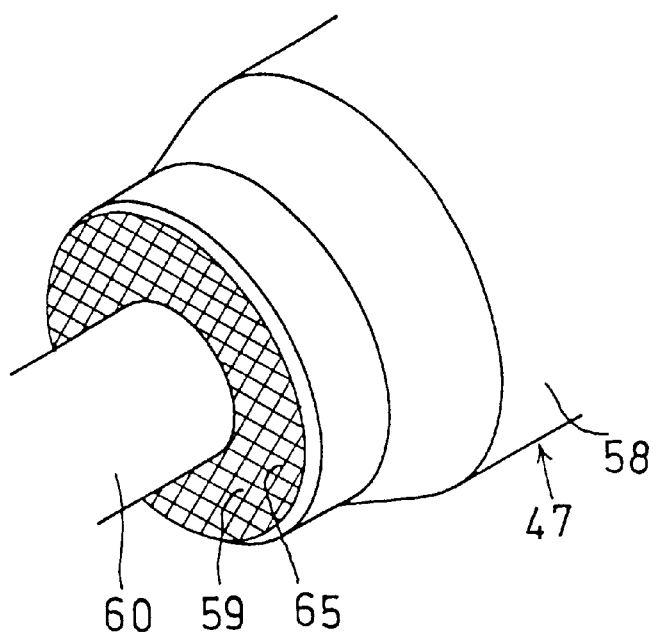

As examples of surface treatment, there are three methods, i.e. impressing a grease groove 63 circumferentially in the side face of the shoulder portion 59 of the constant-velocity joint 47 as shown in FIG. 29, forming stripes 64 concentric relative to the axis of the stem in the side face of the shoulder portion 59 when grinding the outer surface of the stem 60 and the side of the shoulder portion 59 as shown in FIG. 30, and coating a sliding agent 65 such as grease on the side face of the shoulder portion 59 as shown in FIG. 31.

Figure 32:
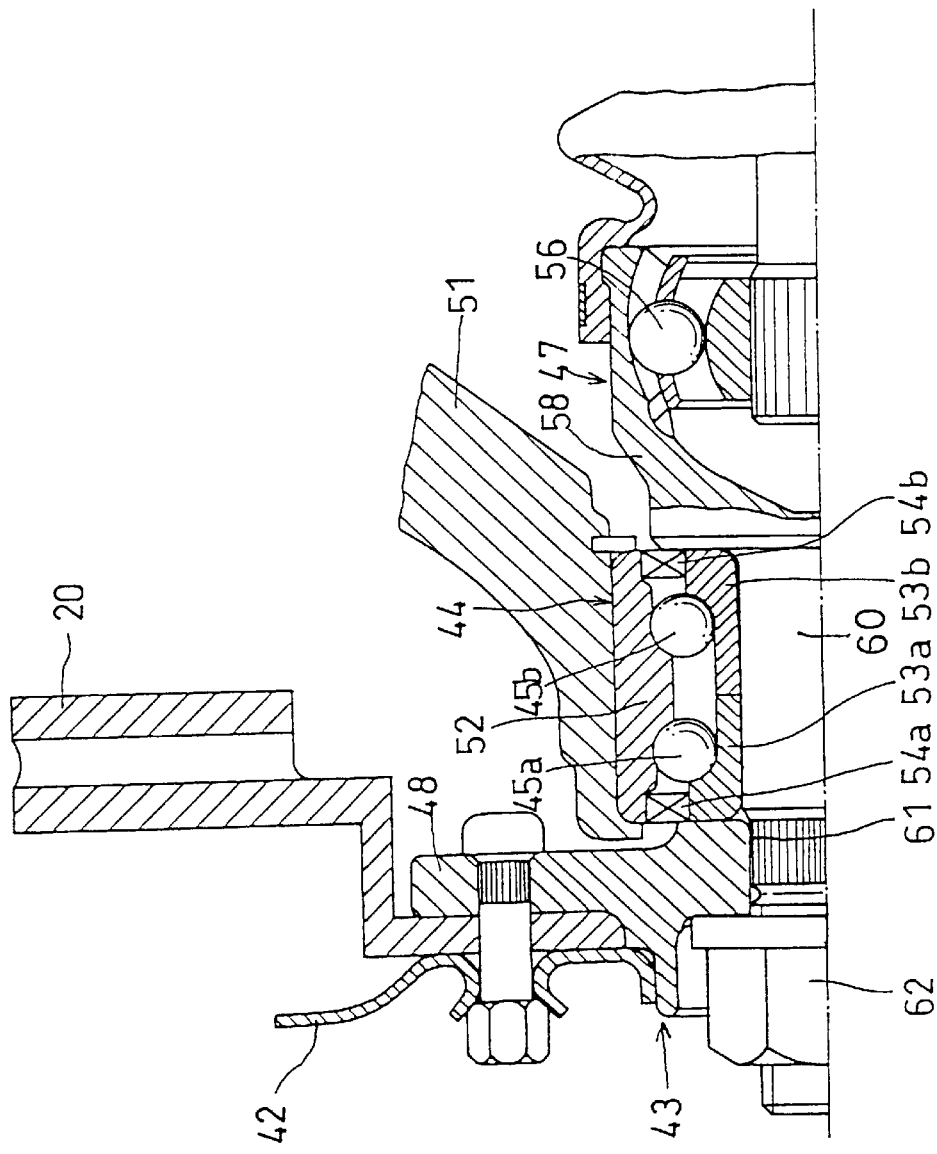
FIG. 32 is a partial sectional view showing a still another embodiment of a wheel bearing assembly for a driven wheel in which is mounted a constant-velocity joint according to this invention.

The wheel bearing assembly for a driven wheel shown in FIG. 32 is a still another embodiment of this invention.

Figure 33:
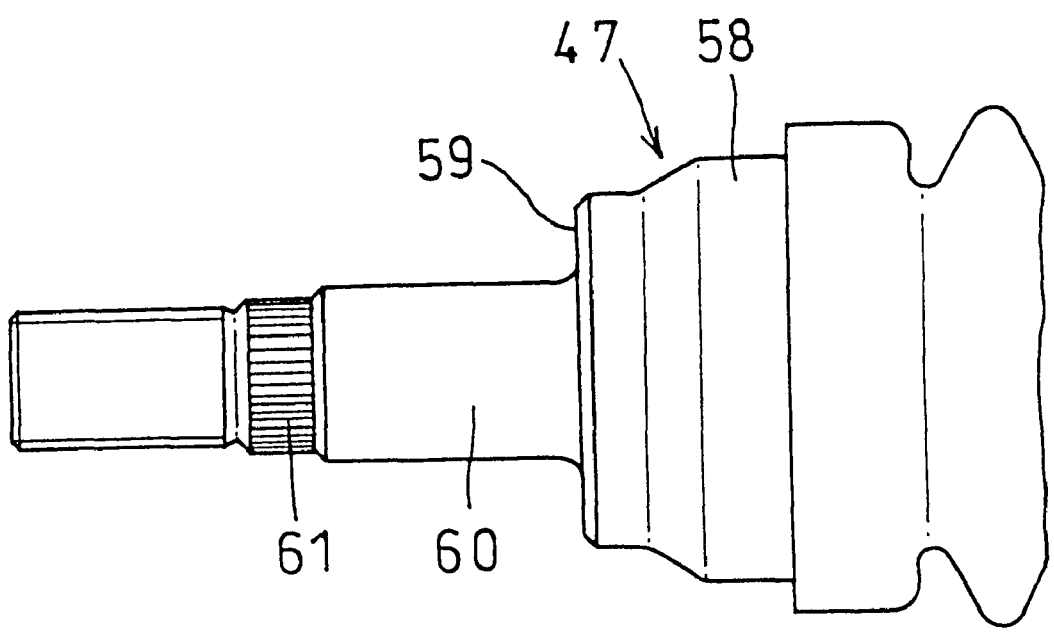
FIG. 33 is a partial view of a constant-velocity joint used in the embodiment of FIG. 32.

This embodiment has no shaft portion 49 of the wheel-mounting hub 43 as in the last embodiment. As shown in FIGS. 32 and 33, the axle bearing 44 is provided around the stem 60 of the constant-velocity joint 47. Although it differs from the last embodiment in the shapes of the wheel-mounting hub 43 and the constant-velocity joint 47, same numbers are used to corresponding portions.

For the constant-velocity joint 47 of this embodiment too, runout variation of the side of the shoulder portion 59 of the outer ring 58 and its perpendicularity relative to the axis of the stem are controlled within a standard value, which is 30 µm or under, preferably 8 µm or under.

Also, in this embodiment too, surface treatment for reducing frictional resistance is preferably applied to the side of the shoulder portion 59 of the constant-velocity joint 47 as in the last embodiment shown in FIGS. 30 and 31.

According to this invention, since the perpendicularity and runout variation of the shoulder portion of the constant-velocity joint relative to the stem are restricted within a standard value, it is possible to provide a high-quality wheel bearing assembly for a driven wheel in which brake judder and stick-slip sound are suppressed.

What is claimed is:

1. A wheel bearing assembly comprising an outer member having two raceways on an inner peripheral surface thereof, an inner member having raceways formed thereon so that each is opposite to one of said two raceways on said inner peripheral surface of said outer member, and rolling elements arranged in two rows between said outer member and said inner member, one of said outer member and said inner member being formed with a wheel mounting flange, a brake rotor being mounted on one side of said wheel mounting flange, wherein the maximum runout variation of said one side of said wheel mounting flange is restricted within a predetermined value when one of said outer member and said inner member that has a wheel mounting flange is rotated, with the other of said outer member and said inner member being fixed.

2. The wheel bearing assembly as claimed in claim 1 wherein said predetermined value is 50 µm.

3. The wheel bearing assembly as claimed in claim 1 wherein the maximum runout variation per cycle is restricted within a predetermined value.

4. The wheel bearing assembly as claimed in claim 3 wherein said predetermined value is 30 µm.

5. The wheel bearing assembly as claimed in claim 1 wherein the frequency of runout per revolution is equal to the number of wheel mounting bolts multiplied by an integer or the number of said wheel mounting bolts is equal to said frequency multiplied by an integer.

6. The wheel bearing assembly as claimed in claim 1 wherein said wheel mounting flange is integrally formed on said inner member.

7. The wheel bearing assembly as claimed in claim 1 wherein a drive shaft is mounted in said inner member.

8. The wheel bearing assembly as claimed in claim 1 wherein said inner member is formed integrally with an outer ring of a constant-velocity joint.

9. The wheel bearing assembly as claimed in claim 1 wherein said wheel mounting flange is integrally formed on said outer member.

10. The wheel bearing assembly as claimed in claim 1 wherein said raceway s a re formed directly on said outer peripheral surface of said inner member.

11. The wheel bearing assembly as claimed in claim 1 wherein at least one of said raceways formed on said inner member is formed on a separate member.

12. The wheel bearing assembly as claimed in claim 1 wherein said raceways are formed directly on the inner peripheral surface of said outer member.

13. The wheel bearing assembly as claimed in claim 1 wherein the runout of a side face of said wheel mounting flange is restricted before the assembly is assembled.

14. The wheel bearing assembly as claimed in claim 1 wherein the runout of a side face of said wheel mounting flange is restricted after the assembly has been assembled.

15. The wheel bearing assembly as claimed in claim 1 wherein said inner member is provided with a wheel mounting flange, wherein at least one of said raceways formed on said inner member on the side near said wheel mounting flange is formed directly on said inner member, and wherein a heat-affected layer of a hardened layer formed on said raceway on the side near said wheel mounting flange is restricted so as not to reach holes for hub bolts formed in said wheel mounting flange.

16. The wheel bearing assembly as claimed in claim 15 wherein the depth of said hardened layer at said raceway on the side near said wheel mounting flange is 0.7–4 mm at the deepest portion, and the depth of said hardened layer at a seal land portion provided between said raceway and said wheel mounting flange is 0.3–2 mm.

17. The wheel bearing assembly as claimed in claim 15 wherein raceways are directly formed on the inner circumferential surface of said outer member.

18. The wheel bearing assembly as claimed in claim 15 wherein a raceway on the side far from said wheel mounting flange is formed directly on the outer circumferential surface of said inner member.

19. The wheel bearing assembly as claimed in claim 15 wherein a drive shaft is mounted in said inner member.

20. The wheel bearing assembly as claimed in claim 15 wherein said inner member is formed integral with an outer ring of a constant-velocity joint.

21. The wheel bearing assembly as claimed in claim 1 wherein said brake rotor is mounted to one side of said wheel mounting flange, wherein said one side of said wheel mounting flange is finished to finer surface roughness than the other side.

22. The wheel bearing assembly as claimed in claim 21 wherein said one side of said wheel mounting flange has a surface roughness value of 3 Ra or under, and the other side has a surface roughness value of 3–6 Ra.

23. The wheel bearing assembly as claimed in claim 21 wherein said wheel mounting flange is integrally formed on said inner member.

24. The wheel bearing assembly as claimed in claim 21 wherein said wheel mounting flange is integrally formed on said outer member.

25. The wheel bearing assembly as claimed in claim 21 wherein said raceways are formed directly on the outer circumferential surface of said inner member.

26. The wheel bearing assembly as claimed in claim 21 wherein said raceways are formed directly on the inner circumferential surface of said outer member.

27. The wheel bearing assembly as claimed in claim 21 wherein at least one of said raceways on said inner member is formed on a separate member.

28. The wheel bearing assembly as claimed in claim 21 wherein a drive shaft is mounted in said inner member.

29. The wheel bearing assembly as claimed in claim 21 wherein said inner member is integral with an outer ring of a constant-velocity joint.

30. The wheel bearing assembly as claimed in claim 21 wherein said brake rotor is fixed on a side of said wheel mounting flange near said rolling elements.

31. A method of manufacturing a wheel bearing assembly comprising an outer member having two raceways on an inner peripheral surface thereof, an inner member having raceways each provided so as to be opposite to one of said two raceways on said inner peripheral surface of said outer member, and rolling elements arranged in two rows between said outer and inner members, wherein one of said outer and inner members is provided with a wheel mounting flange, and a brake rotor is mounted to said wheel mounting flange, wherein after a cylindrical portion on the side of the raceways of the one of the outer member and the inner member provided with said wheel mounting flange has been formed by turning, the brake rotor fixing surface of the wheel mounting flange is finished by cutting with the cylindrical surface of said cylindrical portion as a reference.

32. The method as claimed in claim 31 wherein said rotor fixing surface is subjected to secondary turning.

33. The method as claimed in claim 31 wherein said rotor fixing surface is subjected to secondary turning to surface roughness of 3 Ra or under.

34. The method as claimed in claim 31 wherein the finish cutting of said brake rotor fixing surface is carried out after heat treatment.

35. The method as claimed in claim 31 wherein said wheel mounting flange is integrally formed on said inner member.

36. The method as claimed in claim 31 wherein said wheel mounting flange is integrally formed on said outer member.

37. The method as claimed in claim 31 wherein the raceways are formed directly on the outer circumferential surface of said inner member.

38. The method as claimed in claim 31 wherein the raceways are formed directly on the inner circumferential surface of said outer member.

39. The method as claimed in claim 31 wherein at least one of the raceways of said inner member is formed on a separate member.

40. The method as claimed in claim 31 wherein a drive shaft is mounted in said inner member.

41. The method as claimed in claim 40 wherein said inner member is integral with an outer ring of a constant-velocity joint.

42. The method as claimed in claim 31 wherein the fixing surface of said brake rotor is formed on said wheel mounting flange at the side where the raceways are provided.

43. A constant-velocity joint for a driven wheel, comprising an outer ring having a shoulder portion on which an end face of an inner ring of an axle bearing abuts, and a stem coupled to a wheel-mounting hub, characterized in that the perpendicularity and runout variation of a side of said shoulder portion on which the end face of said inner ring of said axle bearing abuts relative to the axis of the stem are restricted within a predetermined value.

44. The constant-velocity joint as claimed in claim 43 characterized in that said predetermined value is 30 $\mu$m or less.

45. The constant-velocity joint as claimed in claim 43 wherein surface treatment for reducing frictional resistance is applied to the side of said shoulder portion.

46. The constant-velocity joint as claimed in claim 45 wherein said surface treatment is forming a circumferential grease groove in the side of said shoulder portion.

47. The constant-velocity joint as claimed in claim 45 wherein said surface treatment is forming stripes in the side of said shoulder portion by grinding so as to be concentric relative to the axis of said stem.

48. The constant-velocity joint as claimed in claim 45 wherein said surface treatment is coating a sliding agent.

49. The constant-velocity joint as claimed in claim 43 wherein said wheel-mounting hub has a shaft portion protruding inwardly, and said inner ring of said axle bearing is arranged around said shaft portion.

50. The constant-velocity joint as claimed in claim 43 wherein said inner ring of said axle bearing is fitted around said stem, and splines are formed at the tip of said stem so as to engage said wheel mounting hub.

\* \* \* \* \*